(12) United States Patent
Olson

(10) Patent No.: US 8,856,182 B2
(45) Date of Patent: Oct. 7, 2014

(54) REPORT DATABASE DEPENDENCY TRACING THROUGH BUSINESS INTELLIGENCE METADATA

(75) Inventor: Jeffrey J. Olson, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 883 days.

(21) Appl. No.: 12/193,542

(22) Filed: Aug. 18, 2008

(65) Prior Publication Data

US 2009/0193050 A1 Jul. 30, 2009

Related U.S. Application Data

(60) Provisional application No. 61/023,757, filed on Jan. 25, 2008.

(51) Int. Cl.
*G06F 7/00* (2006.01)
*G06F 17/30* (2006.01)

(52) U.S. Cl.
CPC .... *G06F 17/30592* (2013.01); *G06F 17/30292* (2013.01)
USPC .......................................................... 707/797

(58) Field of Classification Search
USPC .......................................................... 707/797
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

Shrader, TJ. "Graphical Depiction of Database Table and View Relationships". Mar. 27, 2005. IP.Com. IP.com No. IPCOM000112744D. pp. 477-480.*

(Continued)

*Primary Examiner* — Robert Beausoliel, Jr.
*Assistant Examiner* — Michael Pham
(74) *Attorney, Agent, or Firm* — Sheridan Ross P.C.

(57) ABSTRACT

In one embodiment, the present invention provides a data stream reference module 250 that can enable a user to perform forward tracing, backward tracing, and tracing indirect dependencies in a data model and/or metadata model. The tracing is not necessarily along a common hierarchical level but can be from one level to another.

30 Claims, 24 Drawing Sheets

(56) References Cited

U.S. PATENT DOCUMENTS

| | | |
|---|---|---|
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,839 A * | 8/1999 | Chen et al. .......................... 1/1 |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,308,163 B1 * | 10/2001 | Du et al. ...................... 705/7.25 |

(56) References Cited

U.S. PATENT DOCUMENTS

| | | | |
|---|---|---|---|
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Pertrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,499,026 B1 * | 12/2002 | Rivette et al. ............ 1/1 |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 * | 12/2003 | Rasmussen et al. ............ 1/1 |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,016,919 B2 * | 3/2006 | Cotton et al. ............ 1/1 |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,545,925 B2 | 6/2009 | Williams |
| 7,567,653 B1 | 7/2009 | Michaelis |
| 7,580,944 B2 * | 8/2009 | Zhuge et al. ............ 1/1 |
| 7,885,209 B1 | 2/2011 | Michaelis et al. |
| 2001/0011228 A1 | 8/2001 | Shenkman |
| 2001/0034628 A1 | 10/2001 | Eder |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2003/0004704 A1 | 1/2003 | Baron |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |

(56) References Cited

U.S. PATENT DOCUMENTS

| | | |
|---|---|---|
| 2003/0144900 A1 | 7/2003 | Whitmer |
| 2003/0144959 A1 | 7/2003 | Makita |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1* | 9/2004 | Cuckson et al. ............ 707/104.1 |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0044375 A1 | 2/2005 | Paatero et al. |
| 2005/0049911 A1 | 3/2005 | Engelking et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0171968 A1* | 8/2005 | Yuknewicz et al. ............ 707/102 |
| 2005/0182784 A1 | 8/2005 | Trappen et al. |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0058049 A1 | 3/2006 | McLaughlin et al. |
| 2006/0100973 A1 | 5/2006 | McMaster et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0226231 A1* | 9/2007 | Venkat ............................ 707/100 |
| 2007/0230681 A1 | 10/2007 | Boyer et al. |
| 2007/0239508 A1* | 10/2007 | Fazal et al. ......................... 705/8 |
| 2008/0056165 A1 | 3/2008 | Petrovykh |
| 2009/0193050 A1* | 7/2009 | Olson ............................ 707/102 |
| 2009/0228474 A1* | 9/2009 | Chiu et al. ......................... 707/5 |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 2001-053843 | 2/2001 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

Koutarou, "Building a Framework for EC using Hibernate, OSWorkflow", JAVA Press, Japan, Gujutsu Hyouron Company, vol. 25, 2004, pp. 132-147.

Microsoft R Access 97 for Windows R Application development guide, Ver. 8.0, Microsoft Corp., a first version, pp. 569-599.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Bischoff et al. "Data Ware House Building Method—practical advices telled by persons having experience and experts", Kyouritsu Shuppan Corp. May 30, 2000, first edition, pp. 197-216.

U.S. Appl. No. 12/569,581, filed Sep. 29, 2009, Michaelis.

Blog from "Road warrior and telecommuter—Community for Avaya Users," from http://www.avayausers.com/showthread.php?p=13430, earliest post date Nov. 21, 2006, printed on Sep. 15, 2009, 4 pages.

Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom . . . , 1 page.

Overview of Avaya IP Softphone printed on Sep. 15, 2009 from http://support.avaya.com/elmodocs2/ip_softphone/Overview_IP_Softphone_R6.htm, 2 pages.

Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . , 1 page.

Product Description of "Avaya one-X Agent," printed on Sep. 15, 2009 from http://www.avaya.com/usa/product/avaya-one-x-agent, 1 page.

Product Overview of "IP Softphone" printed on Sep. 15, 2009 from http://www.nacr.com/Products.aspx?id=236, 3 pages.

U.S. Appl. No. 12/789,038, filed May 27, 2010, Bland et al.

US 6,537,685, 3/2003, Fisher et al. (withdrawn).

U.S. Appl. No. 10/815,534, filed Mar. 31, 2004, Kiefhaber.

U.S. Appl. No. 10/815,566, filed Mar. 31, 2004, Kiefhaber.

U.S. Appl. No. 10/815,584, filed Mar. 31, 2004, Kiefhaber.

U.S. Appl. No. 10/861,193, filed Jun. 3, 2004, Flockhart et al.

U.S. Appl. No. 10/946,638, filed Sep. 20, 2004, Flockhart et al.

U.S. Appl. No. 11/199,828, filed Aug. 8, 2005, Bland et al.

U.S. Appl. No. 11/245,724, filed Oct. 6, 2005, Flockhart et al.

U.S. Appl. No. 11/517,646, filed Sep. 7, 2006, Hackbarth et al.

U.S. Appl. No. 11/536,546, filed Sep. 28, 2006, Hackbarth et al.

U.S. Appl. No. 11/861,857, filed Sep. 26, 2007, Tendick et al.

U.S. Appl. No. 12/242,916, filed Oct. 1, 2008, Kiefhaber et al.

(56) References Cited

OTHER PUBLICATIONS

A.A. Vaisman et al., "A Temporal Query Language for OLAP: Implementation and a Case Study", LNCS, 2001, vol. 2397, 36 pages.

Ahmed, Sarah, "A Scalable Byzantine Fault Tolerant, Secure Domain Name System," thesis submitted to Massachusetts Institute of Technology, Department of Electrical Engineering and Computer Science, Jan. 22, 2001, 101 pages.

An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.

Andy Zmolek; "SIMPLE and Presence: Enterprise Value Propositions," Avaya presentation, 16 pages, presented Jan. 24, 2002.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Avaya IQ "Introducing Reporting and Analytics as You Designed It", 2007, 4 pages.

Avaya, Inc. Business Advocate Options, at http://www.avaya.com, downloaded on Feb. 15, 2003, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Berners-Lee et al.; "Uniform Resource Identifiers (URI); Generic Syntax," Network Working Group, Request for Comments 2396 (Aug. 1998), 38 pages.

Bill Michael, "The Politics of Naming" www.cConvergence.com (Jul. 2001) pp. 31-35.

Chavez, David, et al., "Avaya MultiVantage Software: Adapting Proven Call Processing for the Transition to Converged IP Networks," Avaya, Inc., Aug. 2002.

Cherry, "Anger Management," IEEE Spectrum (Apr. 2005) (1 page).

Coles, Scott, "A Guide for Ensuring Service Quality in IP Voice Networks," Avaya, Inc., 2002, pp. 1-17.

ComputerWorld, ETL, M. Songini, at http://www.computerworld.com/databasetopics/businessintelligence/datawarehouse/story/ . . . , copyright 2005, 5 pages.

Creating and Using Data Warehouse Dimension Tables (Microsoft) copyright 2005, http://msdn.microsoft.com/library/en-us/createdw/createdw_10kz.asp?frame=true, 3 pages.

Creating and Using Data Warehouse—Using Dimensional Modeling (Microsoft) downloaded May 18, 2005 http://msdn.microsoft.com/library/en-us/createdw/createdw_39z.asp?frame=true 1 page.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

CS 345: Topics in Data Warehousing, Oct. 5, 2004, 36 pages.

D. Browning et al., "Data Warehouse Design Considerations", Microsoft SQL 2000 Technical Articles, Dec. 2001, 24 pages.

D. Smith, "Data Model Overview Modeling for the Enterprise While Serving the Individual", Teredata Global Sales Support, 2007, 33 pages.

Data Warehouse—Surrogate Keys, Keep Control Over Record Identifiers by Generating New Keys for the Data Warehouse, Ralph Kimball, May 1998, 4 pages.

Data Warehouse Designer—Design Constraints and Unavoidable Realities, No design Problem in School was This Hard, Ralph Kimball, Sep. 3, 2002, 3 pages.

Data Warehouse Designer—An Engineer's View—Its' Worthwhile to Remind Ourselves Why We Build Data Warehouses the Way We Do, Ralph Kimball, Jul. 26, 2002, 3 pages.

Data Warehouse Designer—Divide and Conquer, Build Your Data Warehouse One Piece at a Time, Ralph Kimball, Oct. 30, 2002, 3 pages.

Data Warehouse Designer—TCO Starts with the End User, Ralph Kimball, May 13, 2003, http://www.intelligententerprise.com/030513/608warehouse1_1.jhtml?_requestid=598425, 3 pages.

Data Warehouse Designer—The Soul of the Data Warehouse, Part One: Drilling Down, Ralph Kimball, Mar. 20, 2003, 3 pages.

Data Warehouse Designer—The Soul of the Data Warehouse, Part Three: Handling Time, Ralph Kimball, Apr. 22, 2003, 3 pages.

Data Warehouse Designer—The Soul of the Data Warehouse, Part Two: Drilling Across, Ralph Kimball, Apr. 5, 2003, 3 pages.

Data Warehouse Designer—Two Powerful Ideas, The Foundation for Modern Data Warehousing, Ralph Kimball, Sep. 17, 2002, 3 pages.

Data Warehouse Designer Fact Tables and Dimension, Jan. 1, 2003, http://www.inteeigententerprise.com/030101/602warehouse1_1.jhtml, Ralph Kimball, 3 page.

Dawson et al.; "Vcard MIME Directory Profile," Network Working Group (Sep. 1998), available at http://www.ietf.org/rfc/rfc2426.txt?number=2426, 40 pages.

Dawson, "NPRI's Powerguide, Software Overview" Call Center Magazine (Jun. 1993), p. 85.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Definity Communications System Generic 3 Call Vectoring/Expert Agent Selection (EAS) Guide, AT&T publication No. 555-230-520 (Issue 3, Nov. 1993).

(56) References Cited

OTHER PUBLICATIONS

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps. gz, 1999, 8 pages.
Fielding et al.; "Hypertext Transfer Protocol—HTTP/1.1," Network Working Group, Request for Comments 2068 (Jan. 1997), 152 pages.
Foster, Robin, et al., "Avaya Business Advocate and its Relationship to Multi-Site Load Balancing Applications," Avaya, Inc., Mar. 2002, 14 pages.
Fundamentals of Data Warehousing—Unit 3—Dimensional Modeling, Fundamentals of Data Warehousing, copyright 2005—Evolve Computer Solutions, 55 pages.
G. Hellstrom et al., "RFC 2793—RTP Payload for Text Conversation," Network Working Group Request for Comments 2793 (May 2000), available at http://www.faqs.org/rfcs/rfc2793.html, 8 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
G. Wiederhold, "Mediation to Deal with Heterogeneous Data Sources", Stanford University, Jan. 1999, 19 pages.
Geotel Communications Corporation Web site printout entitled "Intelligent CallRouter Optimizing the Interaction Between Customers and Answering Resources.", 1998, 6 pages.
Glossary—Curlingstone Publishing, http://www.curlingstone.com/7002/7002glossary.html, downloaded May 24, 2005, 11 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
J. Cahoon, "Fast Development of a Data Warehouse Using MOF, CWM and Code Generation", CubeModel, May 22, 2006, 32 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Kimball, et al., "Practical Techniques for Extracting, Cleaning, Conforming, and Delivering Data." The Data Warehouse ETL Toolkit. 2004. Ch. 5, pp. 170-174.
Kimball, et al., "The Complete Guide to Dimensional Modeling." The Data Warehouse Toolkit. 2nd Edition, 2002. Ch. 11, pp. 240-241.
L. Cabibbo et al., "An Architecture for Data Warehousing Supporting Data Independence and Interoperability", International Journal of Cooperative Information Systems, Nov. 2004, 41 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).

Microsoft Office Animated Help Tool, date unknown, 1 page.
MIT Project Oxygen, Pervasive, Human-Centered Computing (MIT Laboratory for Computer Science) (Jun. 2000) pp. 1-15.
Multi-Dimensional Modeling with BW ASAP for BW Accelerator Business Information Warehouse, copyright 2000, 71 pages.
NICE Systems—"Insight from Interactions," "Overwhelmed by the Amount of Data at your Contact Center?" http://www.nice.com/products/multimedia/analyzer.php, (Printed May 19, 2005) (2 pages).
NICE Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segId=0&parID=0&catID=-9191&rend_id . . . (Copyright 1999-2005) (1page).
O. Boussaid et al., "Integration and dimensional modeling approaches for complex data warehousing", J. Global Optimization, vol. 37, No. 4, Apr. 2007, 2 pages.
Presentation by Victor Zue, The MIT Oxygen Project, MIT Laboratory for Computer Science (Apr. 25-26, 2000) 9 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sarda, "Temporal Issues in Data Warehouse Systems", 1999, Database Applications in Non-Traditional Environments (DANTE'99), S. 27, DOI: 10.1109/DANTE.1999.844938.
Snape, James, "Time Dimension and Time Zones." 2004. pp. 1-10. http://www.jamessnape.me.uk/blog/CommentView,gui,79e910a1-0150-4452-bda3-e98d.
Stevenson et al.; "Name Resolution in Network and Systems Management Environments"; http://netman.cit.buffalo.edu/Doc/DStevenson/NR-NMSE.html; printed Mar. 31, 2003; 16 pages.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Thayer Watkins, "Cost Benefit Analysis", 1999, San Jose State University Economics Department, Web Archive http://web.arch ive.org/web/19990225143131/http://www.sjsu.edu/faculty/watkins/cba.htm.
The Importance of Data Modeling as a Foundation for Business Insight, Larissa Moss and Steve Hoberman, copyright 2004, 38 pages.
"Avaya IQ—Building Upon the Strengths of CMS", White Paper, Feb. 2007, 11 pages.
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Dimensional database", Wikipedia, downloaded Aug. 30, 2007 (3 pages).
"Driving Model Agent Behaviors With Avaya IQ", White Paper, Apr. 2007, 12 pages.
"KANA—Contact Center Support", available at http://www.kana.com/solutions.php?tid=46, copyright 2006, 3 pages.
"Learn the structure of an Access database", available at http://office.microsoft.com/en-us/access/HA012139541033.aspx, site updated Nov. 13, 2007, pp. 1-4.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Still Leaving It to Fate?: Optimizing Workforce Management", Durr, William Jr., Nov. 2001.

(56) References Cited

OTHER PUBLICATIONS

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

U.S. Appl. No. 11/242,687, filed Oct. 3, 2005, Krimstock et al.

Akitsu, "An Introduction of Run Time Library for C Program, the fourth round," C Magazine, Jul. 1, 1990, vol. 2(7), pp. 78-83.

Emura, "Windows API Utilization Guide, Points for Knowledges and Technologies," C Magazine, Oct. 1, 2005, vol. 17(10), pp. 147-150.

Examiner's Office Letter (including translation) for Japanese Patent Application No. 2007-043414, mailed Jul. 7, 2010.

Official Action for Canada Patent Application No. 2,639,362, dated Jan. 7, 2013 4 pages.

\* cited by examiner

AVAYA  Historical Report References

HRR/StandardHistoricalReports/AgentWorkGroupPerformance/AgentOccupancySummary for Release 4.2 as of 1/21

Agent Occupancy - Summary
(List Query)
*Column Listing*

Model definitions and database columns used, for data items in this query in this report. See also other queries for this report, or detailed dependencies for this query.

| Agent | Agent EID | Work Group | Work Group EID | TimePeriodActivation | Interval Staffed Dur. | % Occ. | % Preview Dur. | % Active Dur. | % Wrap up Dur. |
|---|---|---|---|---|---|---|---|---|---|

(Filter Work Group EID)

- Agent
  - Definition:
    - [Agent & Work Group Performance].[Agent].[Agent]

| | A | B | C | D | E |
|---|---|---|---|---|---|
| 1 | Report | Query | Item | Table | Column |
| 4304 | NoReport | NoQuery | NoItem | AgentStateSum | IntervalSize |
| 4305 | AgentOccupancySummary | List Query | % Active Dur. | AgentStateSum | IntervalStateDur |
| 4306 | AgentOccupancyTrend | List and Chart Query | % Active Dur. | AgentStateSum | IntervalStateDur |
| 4307 | WorkGroupOccupancySummary | List Query | % Active Dur. | AgentStateSum | IntervalStateDur |
| 4308 | WorkGroupOccupancyTrend | List and Chart Query | % Active Dur. | AgentStateSum | IntervalStateDur |
| 4309 | AgentOccupancySummary | List Query | % Alert Dur. | AgentStateSum | IntervalStateDur |
| 4310 | AgentOccupancyTrend | List and Chart Query | % Alert Dur. | AgentStateSum | IntervalStateDur |
| 4311 | WorkGroupOccupancySummary | List Query | % Alert Dur. | AgentStateSum | IntervalStateDur |
| 4312 | WorkGroupOccupancyTrend | List and Chart Query | % Alert Dur. | AgentStateSum | IntervalStateDur |
| 4313 | AgentOccupancySummary | List Query | % Idle Dur. | AgentStateSum | IntervalStateDur |
| 4314 | AgentOccupancyTrend | List and Chart Query | % Idle Dur. | AgentStateSum | IntervalStateDur |
| 4315 | WorkGroupOccupancySummary | List Query | % Idle Dur. | AgentStateSum | IntervalStateDur |
| 4316 | WorkGroupOccupancyTrend | List and Chart Query | % Idle Dur. | AgentStateSum | IntervalStateDur |

REPORT DATABASE DEPENDENCY TRACING THROUGH BUSINESS INTELLIGENCE METADATA

CROSS REFERENCE TO RELATED APPLICATION

The present application claims the benefits of U.S. Provisional Application Ser. No. 61/023,757, filed Jan. 25, 2008, of the same title, which is incorporated herein by this reference in its entirety.

FIELD OF THE INVENTION

The invention relates generally to database reporting and particularly to user access and configuration of databases.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill.

The primary objective of contact center management, including call-distribution algorithms, is to ultimately maximize contact center performance and profitability. An ongoing challenge in contact center administration is monitoring of selected data entities associated with contact center operation to optimize the use of contact center resources and maximize agent performance and profitably. Current products for monitoring and reporting on contact center performance, such as Call Management System or CMS™ and Avaya IQ™ by Avaya, Inc., are configured as data warehouses that extract data from multiple sources, transform the data into a normalized form, and load the data into the data warehouse database, typically on a real time basis.

A common type of data warehouse is based on dimensional modeling. Dimensional modeling is a data model that divides the world into measurements and context. Measurements are usually numeric and taken repeatedly. Numeric measurements are facts. Facts are surrounded by textual context in existence when the fact is recorded. Context is often subdivided into dimensions. Fact tables are used in dimensional modeling to logically model measurements with multiple foreign keys referring to the contextual entities. The contextual entities each have an associated primary key. A "key" is a data element (e.g., attribute or column) that identifies an instance of an entity or record in a collection of data, such as a table. A "primary key" is a column or combination of columns whose values uniquely identify a row in a table or is the attribute or group of attributes selected from the candidate keys as the most suitable to uniquely identify each instance of an entity. A "foreign key" refers to a column or combination of columns whose values are required to match a primary key in another table or is a primary key of a parent entity that contributes to a child entity across a relationship. Types of primary keys include a natural key, or a key having a meaning to users, and a surrogate key, or a key that is artificially or synthetically established, meaningless to users, and used as a substitute for a natural key.

If the same entity (e.g., agent) is represented on multiple data sources (e.g., inbound call system and outbound call system) by different natural keys, a traditional data warehouse generates and assigns a surrogate key to identify the entity. The surrogate key is an internal identifier managed by the data warehouse. For example, in a contact center an agent may handle inbound calls from one system and outbound calls from another system, with different identities on each system. Data warehouses commonly process each data source independently, performing data correlation across sources at a later time.

Some data models specify a behavior known as a type 2 slowly changing dimension. A type 2 dimension tracks the history of changes to an entity over time. When an attribute of an entity is changed, such as when a contact center agent changes their skill set or group membership, a new surrogate key for that entity is generated, and a new row inserted into the database. Fact data associated with the entity can now be tracked separately for activities that occurred before versus after the change by referencing the appropriate surrogate key.

Business intelligence software, such as sold under the tradename COGNOS 8 provided by Cognos, is an example of a data warehouse. Using web-based tools, e.g. Cognos "Report Studio", business intelligence software can provide "drag and drop" report creation based on selected data stored in a database. This technology relies on proprietary query engines to construct appropriate Structure Query Language (SQL) queries based on descriptive information in a "metadata model" created e.g. through the Cognos "Framework Manager" tool. Instead of mere schema definition, the metadata model defines all the transformations and business rules needed to cook the raw data into the final report metrics.

Business intelligence software is used in Avaya IQ™, which is an example of a data warehouse tailored for contact center data collection and reporting. Avaya IQ™ has a number of differing layers or components. A first component, referred to as "Tables", is the database fact and dimension tables containing the collected data. A second component, referred to as "Views", is a set of database views to enable access to the data in the Tables. A third component, referred to herein as "Reporting Model", provides a schema definition and defines the transformations and business rules needed to convert the data into the final reports. This third component is also referred to in COGNOS 8 as the aforementioned metadata model. A fourth component, referred to as "Reports", provides report specifications for the final reports.

Business intelligence software generally provides only limited database dependency information to an unsophisticated user. In COGNOS 8, for example, one performs forward tracing, from a given object to other objects that reference it in their defining expressions, using a feature "Find Report Dependencies". This feature allows the user to select any object (or collection of objects) in the reporting model and find the list of reports that depend on the object. But the definition of "depend" is limited to those reports that explicitly and directly reference the object in question, so it provides the correct answer only for those few objects that include the thin interface layer (presentation layer) of the reporting model. It does not reveal indirect (chained) dependencies at all. Attempting to use this feature on the vast majority of internal objects in the reporting model (including those at the lowest layer corresponding to items in the database) can give a false impression that no reports depend upon such objects so those objects can be safely deleted from the model. Even for objects in the interface layer that are used by reports, this feature fails to identify the particular items within the report that reference the object in question. To answer that question, the user must open each individual report using the "Report Studio" tool and check manually the expression for all the data items in all the queries defined for that report. Furthermore, the "Find Report Dependencies" feature does not address dependencies between pairs of objects within the reporting model. The only way, that the reporting model user can determine if and where an object is used elsewhere in the model, is to delete that object and hope to see a warning message listing the dependent objects. But even this technique gives occasional false assurances (in cases involving query items in an object known as a query subject shortcut). There is also another feature, "Analyze Publish Impact", that allows the author of the reporting model to determine which reports will be affected by an, as yet, unpublished change to the reporting model. This was the precursor feature to "Find Report Dependencies" and suffers from the save short falls, plus the added disadvantage that it requires the user to modify the reporting model to see any results.

Backward tracing, from a given object to the other objects that are referenced in its defining expression, would seem to be straight forward, but it is not. The normal operation of Framework Manager allows a user to select an object from a deeply branched tree of previously defined objects and include its reference as a term in the expression for a new/modified object. Nominally, all the user must do to trace backward to those included objects is examine the saved expression and check for references to any predecessor objects. The problem in the reporting model environment is that object references include only the nearest namespace object without identifying where in the deeply branched tree that namespace is located. There is no index of namespaces that can lead one back to a particular namespace and examine the objects it contains. The user must simply know the overall structure of the deeply branched tree (containing hundreds of namespaces) and do an exhaustive manual search of each tree branch until the desired namespace is found. For the broader problem of tracing from a particular item in a particular report backward to the database, the user must start by opening that report in the Report Studio tool and examining the expression for the item in the report query. Not only is this a time-consuming manual operation but also it simply leads back to the reporting model and the problem described above with reference to the Framework Manager tool. To trace backward to the raw database side of the reporting model, the user must have the author's knowledge of the reporting model structure.

With respect to tracing indirect dependencies based on foreign keys of filters, the Framework Manager tool does define and diagram relationships between objects (similar to foreign key relationships between database tables), but their use is limited to the heuristic rules embedded in the proprietary query engine software that generates actual Structured Query Language (SQL) queries from particular report specifications. Following such relationships is important to identifying which foreign key column in a database fact table determines the choice of rows displayed from a dimension table. Highly skilled authors of reporting models have sufficient sophistication to second guess how the query engine is likely to infer such indirect dependencies, but the tools do not reveal how specific indirect dependencies are established. Part of the difficulty is that this determination cannot be made from the reporting model alone. It requires the context of a particular query from a particular report to estimate how such dependencies are established. The Report Studio feature allows the user to examine a prototype of the SQL code that would be generated on behalf of a particular report query. Such queries may contain hundreds of lines of SQL code that only a database expert with great patience could decipher to trace indirect dependencies. This is not a practical way for tracing indirect dependencies.

There remains a need for quality, clarity, verifiability, and maintainability. Reporting models can be enormous and complex in comparison to the data model. In view of the complexity, the reports can be worthless if the data they produce cannot be understood and trusted. Pertinent questions to be understood include: (i) what report values, if any, derive from a particular item in the database (e.g., in case the database is in error or to know how it is manifested for testing); (ii) what database items contribute to a particular value in a report (e.g., to isolate the problem in case the report value is in error); (iii) how does a particular report item derive from database values and what is the formula (e.g., to document the report verify the business rules or instill customer confidence); (iv) even if a particular database item is not in an existing report, is it available for inclusion in future reports (e.g., are reportability and customization requirements met); and (v) when a reporting model is being used, how does an object in the reporting model trace forward toward reports or back toward the database (e.g., is this object needed). In short, database reporting applications require transparency and traceability in both directions between the database and the reports. It is therefore desirable to provide an interface permitting users of a wide variety of differing levels of technical expertise to understand what data is produced for reporting and how that data relates back to the raw data in the database.

Microsoft Access 2007 provides relevant features, but outside of the business intelligence arena. This product provides a feature, known as "Object Dependencies pane", which allows the user to see both "Objects that depend on me" and "Objects that I depend on". It can determine what report values, if any, derive from a particular item in the database and what database items contribute to a particular value in a report but the approach is limited in the depth of dependencies that can be displayed and is specific to the Microsoft Access environment where reports and databases are part of the same proprietary package. It therefore does not address the current problems in the business intelligence domain due to its narrow focus and scaling limitations (e.g., it is unable to do end-to-end dependencies for large or complex systems due to depth limitations).

SUMMARY OF THE INVENTION

These and other needs are addressed by the various embodiments and configurations of the present invention. The invention is directed generally to a database warehouse tool to assist user interaction with dependencies among the reporting objects and the database.

In one embodiment, a database system includes a database defined by a data model, a metadata model comprising descriptive information, the descriptive information defining transformations and rules to convert raw data in the database to selected output, and a query engine to construct, based on user input and the descriptive information, appropriate queries and/or commands to the database. The data and metadata models collectively define a hierarchical tree structure. A tool is provided to assist the user in interacting with the query model by displaying a plurality of linked images to the user. The images enable the user to perform one or more of the following steps:

(B1) forward tracing from a selected first item in a first level of the graph to a second item in a second level of the graph, the second item depending upon the first item, by selecting a second link in a first image, the second link being associated with the second item and, in response, providing the user with a second image containing, in turn, the definition and/or dependency information respecting the second item;

(B2) providing a plurality of the following operating modes:

(B2i) in a usage mode, providing a first display to the user, the first display comprising, for the selected first item, an indicator of a degree to which the selected first item is used in the preparation of and/or incorporated in a report;

(B2ii) in a users mode, providing a second display to the user, the second display comprising, for the selected first item, a listing of items using the selected first item;

(B2iii) in a location mode, providing a third display to the user, the third display including, for the selected first item and or any other items shown, the complete location of said item(s) within the hierarchical tree structure in the layers of the reporting system;

(B2iv) in an expression mode, displaying, to the user, an algorithm used to determine the selected first item, the algorithm referencing links to other items in the graph;

(B2v) in a description mode, displaying, to the user, a textual definition of the selected first item, the textual definition being importable and exportable into a markup language specification of a reporting model; and (B2vi) in other modes, providing the user with a plurality of: spreadsheets listing pairings of database columns with dependent items, single-page displays of chained items involved in a definition of a single report data item, and tagging of items in a reporting model;

(B3) back tracing from the selected third item in a second level of the dependency graph to a fourth item in a first level of the graph, the selected third item being dependent upon the fourth item, by selecting a third link in a second image, the third link being associated with the fourth item and, in response, providing the user with a third image containing, in turn, the definition and or dependency information respecting the fourth item;

(B4) providing the user with a series of displays, the displays permitting the user to at least one of (i) expand and contract items in a chain of dependency relationships in the graph to reach a desired item; (ii) move directly from a first item in a first dependency chain to a second item in a second, different dependency chain; and (iii) move directly from a first item in a first dependency chain to a second item in the first dependency chain, the second item being separated, in the first dependency chain, from the first item by a plurality of intervening items;

(5) selecting a fifth link leading to the relations a fifth item in a fifth image to obtain a sixth image comprising a plurality of items related through foreign key(s) to the fifth item and comprising a seventh link to a seventh image, the seventh image containing, in turn, the definition and or dependency information representing an item related to the fifth item through a foreign key relation;

(B6) selecting an eighth link leading to the filters for an eighth item in an eighth image to obtain a ninth image comprising a plurality of filter identifiers associated with the eighth item, which may be expanded to reveal a ninth item in the definition of that filter and comprising a ninth link to a tenth image, the tenth image containing, in turn, the definition and or dependency information for the ninth item; and (B7) providing an eleventh image listing a plurality of output reports, each output report identifier corresponding to a respective image comprising a set of items in the corresponding report, each identified item in turn having a respective link to a respective image, the respective image comprising at least one of a definition of the corresponding identified item and a set of database columns on which the corresponding identified item depends. In one configuration of step (B1), a web page explicitly lists dependent objects and allows navigation to them by hyperlinks. Forward tracing does not require an object to be deleted from the data model in the, sometimes, vain hope that a warning will be raised identifying any objects that depend upon it.

In one configuration of step (B3), a web page presents the expression with each term hyperlinked back to the object being referenced. Back tracing does not require a manual hunt among the many branches of a deeply nested reporting model tree to find an object mentioned as a term in a defining expression. In addition, the full context of the current object is listed at the top of the window to provide the hierarchical location within the tree and allow intermediate navigation to its intermediate nodes.

In one configuration of step (B5), related foreign keys are listed in a web page associated with a selected item.

In one configuration of step (B6), related locale filters are listed in a web page associated with a selected item.

In one configuration of step (B7), end-to-end forward and backward dependencies are listed in a data base report cross reference spreadsheet showing each report item that ultimately depends upon any particular database column and any database column that ultimately contributes to any particular report value. Dependencies are also traceable to individual data items within individual queries of the report, not just to the overall report. Furthermore, multiple degrees of report usage are provided so that accurate usage can be determined even for objects throughout the reporting model, not just those objects in the thin outermost interface layer of the reporting model.

As can be seen, the embodiment can combine new methods for deducing report-database dependencies with the recognition that reporting models are better described as webs rather than trees to produce web pages and spreadsheets generated automatically from existing business intelligence metadata that make accurate report content and dependency information available to a wide audience, in contrast to the incomplete and inaccurate information previously available only to highly skilled practitioners of the art.

The present invention can provide a number of advantages depending on the particular configuration. For example, the tool can permit users of wide levels of technical sophistication to interact efficiently and effectively with even complex databases and reporting architectures. The use of web sites and spreadsheets to provide the information to the user is a familiar and widely accessible format. Users can access the information readily using a conventional web browser. Users can understand and trust reports generated from the database, thereby providing quality, clarity, verifiability, and maintainability. The tool can permit users to debug, document, and customize reports without adversely impacting the integrity of the underlying data structures. The tool can readily enable forward and back tracing, providing, in layered reporting architectures, transparency and traceability in both directions towards and away from the database. The tracing provides more than simply following explicit referencing of one object by another object. In addition to such static dependencies, indirect dynamic dependencies implied by relations between items can be traced forwards or backwards.

These and other advantages will be apparent from the disclosure of the invention(s) contained herein.

The phrases "plurality", "at least one", "one or more", and "and/or" are open-ended expressions that are both conjunctive and disjunctive in operation. For example, each of the expressions "a plurality of A, B and C", "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "forward tracing" refers to iteratively locating one or more items that depend on a selected item. An example of forward tracing is shown by arrow 320 in FIG. 3.

The term "back tracing" refers to iteratively locating one or more items upon which a selected item depends. An example of back tracing is shown by arrow 324 in FIG. 3.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "data stream" refers to the flow of data from one or more, typically external, upstream sources to one or more downstream reports.

The term "dependency" or "dependent" refers to direct and indirect relationships between items. For example, item A depends on item B if one or more of the following is true: (i) A is defined in terms of B (B is a term in the expression for A); (ii) A is selected by B (B is a foreign key that chooses which A); and (iii) A is filtered by B (B is a term in a filter expression for A). The dependency is "indirect" if (i) is not true; i.e. indirect dependencies are based solely on selection (ii) and or filtering (iii).

The terms "determine", "calculate" and "compute," and variations thereof, as used herein, are used interchangeably and include any type of methodology, process, mathematical operation or technique.

The term "item" refers to data fields, such as those defined in reports, reporting model, views, or tables in the database.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 19 is a screen shot according to an embodiment;

Figure 23:
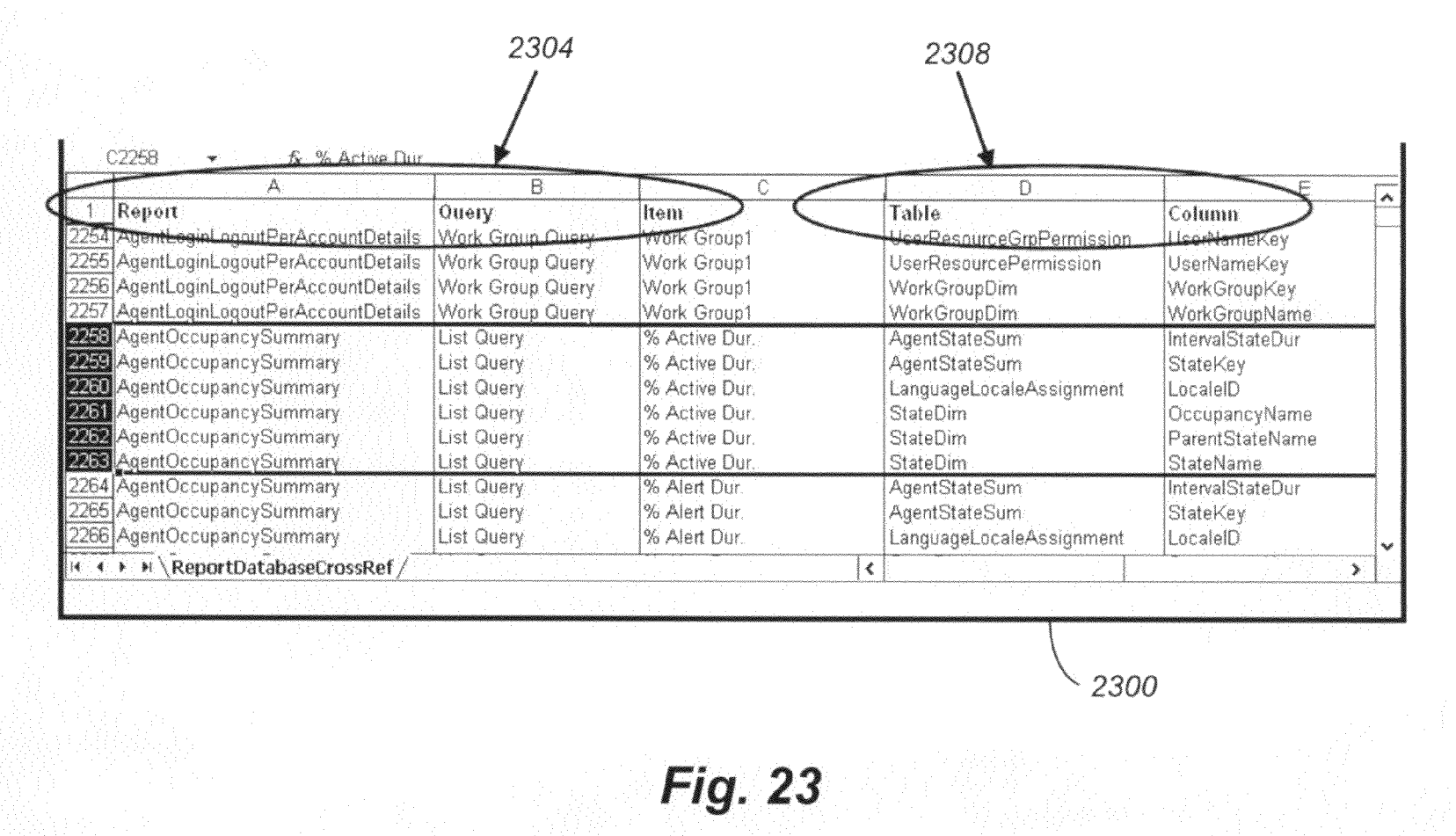

FIG. 23 is a screen shot according to an embodiment;
and
FIG. 24 is a screen shot according to an embodiment.

DETAILED DESCRIPTION

Although the present invention is discussed with reference to a contact center architecture, it is to be understood that the invention can be applied to numerous other architectures, such as business intelligence applications. The present invention is intended to include these other architectures.

The Contact Center Architecture

Figure 1:
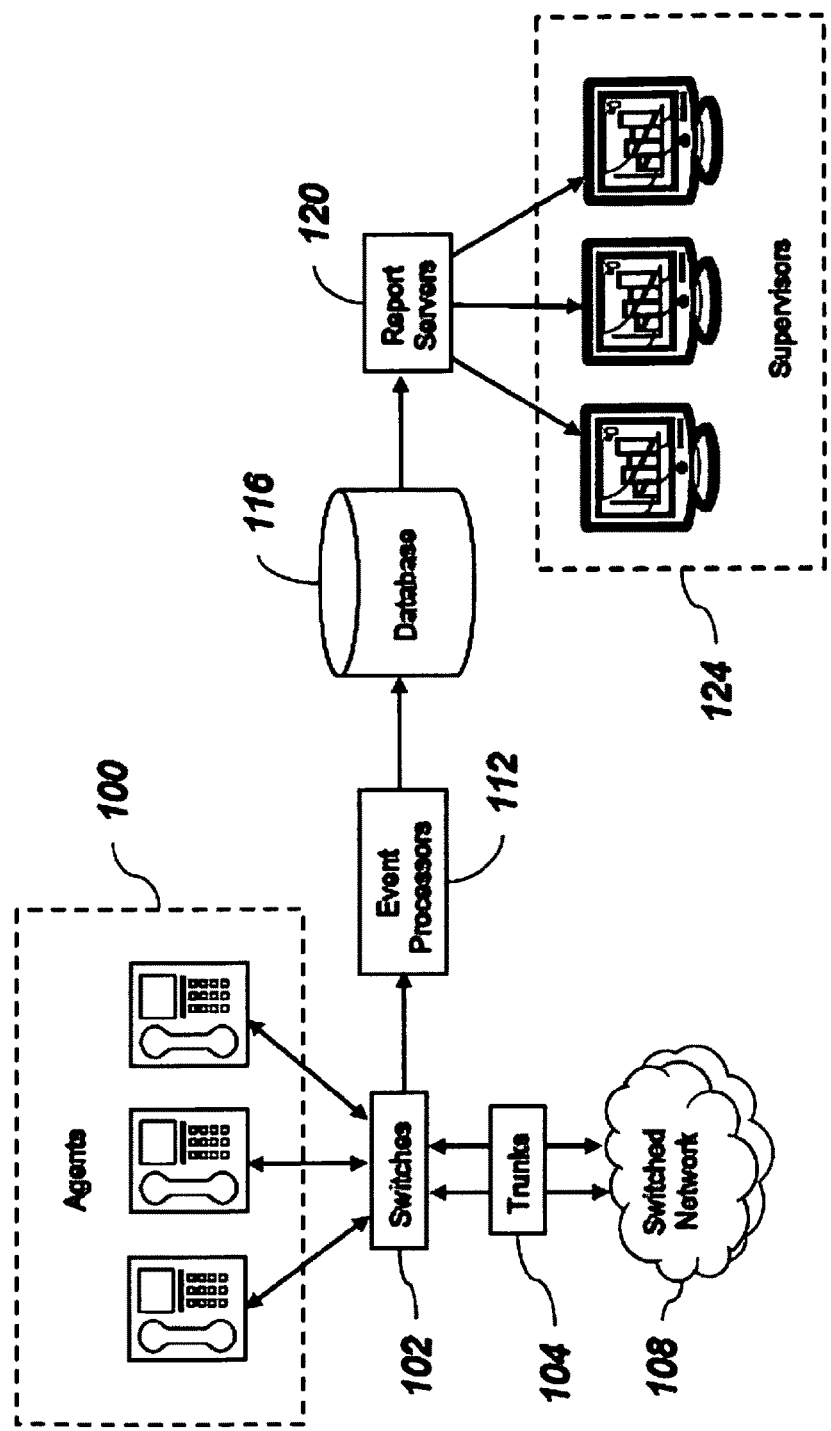
FIG. 1 is a physical block diagram of a contact center reporting architecture according to an embodiment.

FIG. 1 shows an illustrative embodiment of the present invention. Agent communication devices 100 are connected via switches 102 to trunks 104. The trunks 104 connect to circuit and/or packet switched network(s) 108. Customer communication devices (not shown) communicate with the agent communication devices 100 via the network(s) 108.

The agent communication devices 100 and incoming contacts from customer communication devices can be assigned to one another using a queue configuration. Each contact queue (not shown) corresponds to a different set of agent skills, as does each agent queue (not shown). Contacts are prioritized and either are enqueued in individual ones of the contact queues in their orders of priority or are enqueued in different ones of a plurality of contact queues that correspond to a different priority. Likewise, each agent's skills are prioritized according to his or her level of expertise in that skill, and either agents are enqueued in individual ones of agent queues in their order of expertise level or are enqueued in different ones of a plurality of agent queues that correspond to a skill and each one of which corresponds to a different expertise level. Contacts incoming to the contact center are assigned to different contact queues based upon a number of predetermined criteria, including customer identity, customer needs, contact center needs, current contact center queue lengths, customer value, and the agent skill that is required for the proper handling of the contact.

The various activities of the agents and their respective communication devices 100, such as ringing and answering, are tracked through events. The events are converted by event processors 112 into agent performance data in a reporting database 116. Data structures maintained in the database 116 are described in more detail in copending U.S. application Ser. No. 10/861,193, filed Jun. 3, 2004, entitled "Data Model of Participation in Multi-Channel and Multi-Party Contacts", to Kiefhaber, et al., which is fully incorporated herein by this reference. In one configuration, the data structures in the database 116 are defined by a dimensional model, which describes tables and columns in the physical data stores. Examples of data structure attributes describing a customer contact with the contact center include contact identifier, contact type, outbound contact initiation method, customer identifier, data source identifier, party identifier, business role code, party role start timestamp, contact direction code, contact direction description, state identifier, trunk identifier, telephone address, contact participation group, contact part purpose, contact part related reason, contact media type, contact disposition, contact routing method, contact wait treatment, contact qualifier, dialed number purpose, routing construct, and state reason. Other data structures describe attributes of data entities other than contact-related items, such as queues and contact center resources, particularly human agents.

Report servers 120 access the data in the database 116, transform it according to complex rules, and present the resulting reports for viewing by supervisors 124. Embodiments of the present invention can illuminate the complex rules used by the report servers 120.

Figure 2:
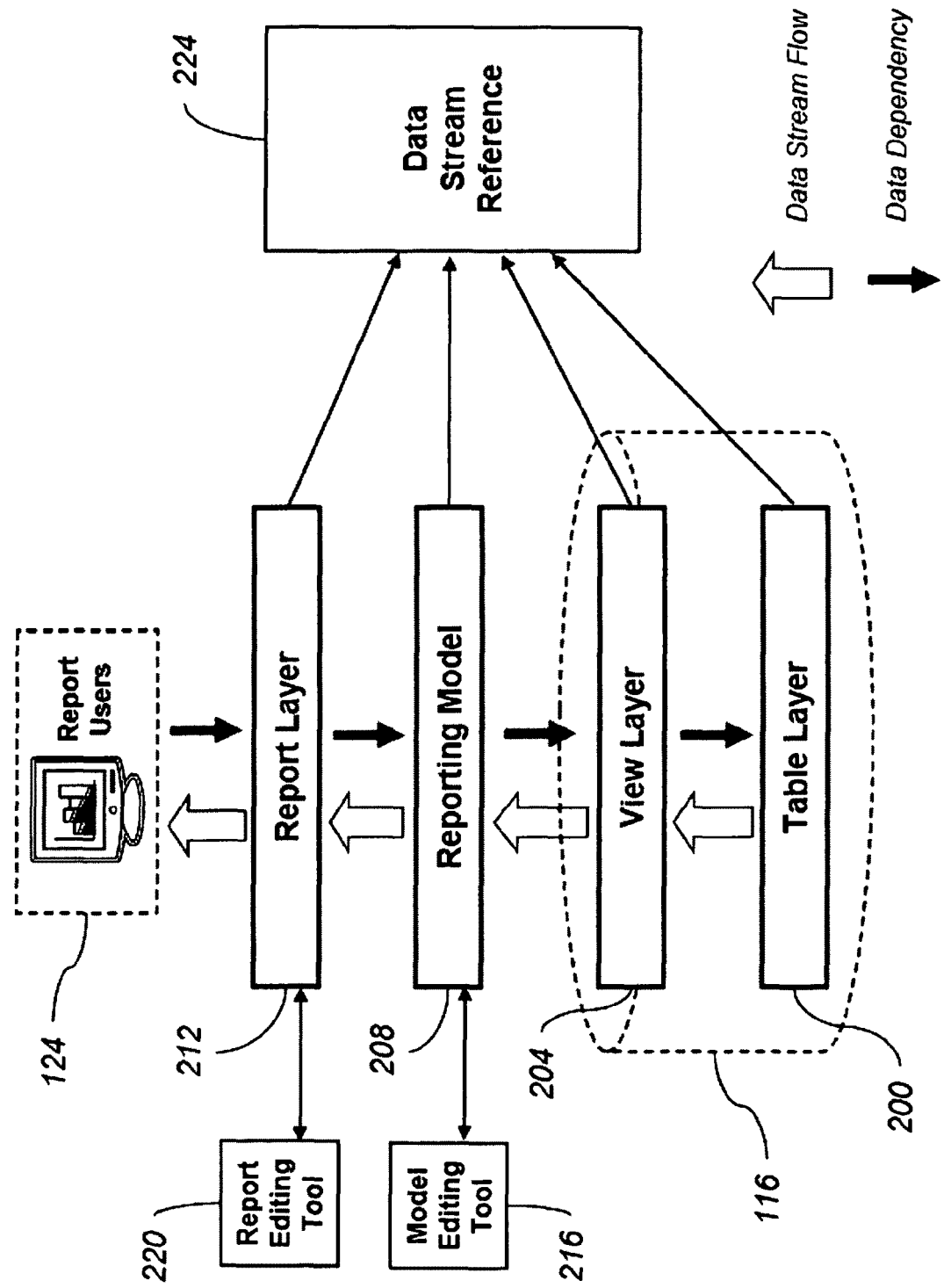
FIG. 2 is a logical block diagram of the layers of interdependent reporting objects according to an embodiment.

FIG. 2 shows the logical layering of information in the flow of data from the database 116 to the report users 124. A table layer 200, consisting of physical tables with columns of measures, and a view layer 204, which rearranges and/or redefines the table layer, are constructs of the database and are defined by common database tools and techniques.

The table and view layers 200 and 204, respectively, define the interface presented by the database to a reporting model 208. The reporting model 208 (which contains descriptive information defining rules and transformations to convert physical data items into output, such as calculations and performance metrics, query subjects that are accessible to reports) (e.g., historical and real-time reporting models) is where the bulk of the complex data transformation rules are controlled. The source code defining the reporting model is typically maintained in an XML file, while the output of the reporting model is published in various packages (not shown) for use in defining reports. Packages may be saved in XML files or kept in a separate database known as a content store (not shown).

The report layer 212 uses the transformed measures that have been exposed in the published reporting model packages to define report specifications which are also typically saved in XML files or in the content store. When a report user requests a particular report, the report server 120 consults the report specification to construct an appropriate database query, based on the information in the reporting model package. The query is executed by the database and the results are formatted and returned by the report server to the report user.

Construction of the complex rules within the reporting model, and to some extent within the report layer, relies on highly skilled people using specialized tools. A model editing tool 216 is used to construct and modify the reporting model and publish its packages. Similarly a report editing tool 220 is used to construct and modify the report specifications in the report layer.

In a typical commercial business intelligence application, the whole reporting environment, including the report server 120, the reporting model 208, the report layer 212 and the tools 216 and 220 are provided together as suite of products comprising a reporting system. An example of such a system is IBM's Cognos ReportNet, later known as Cognos 8. In that system, the model editing tool 216 is known as Framework Manager, and the report editing tool is either Report Studio or Query Studio. The box labeled Data Stream Reference 224 is provided according to the principles of the present invention.

In one configuration, the reporting model is subdivided into database, data marts, subject areas, data sources, parameter maps, and packages sections. The reporting model is normally organized as a tree hierarchy of namespaces and query subjects, culminating in individual calculations, filters, and query items.

It should be emphasized that the configurations shown in FIGS. 1 and 2 are for purposes of illustration only and should not be construed as limiting the invention to any particular arrangement of elements.

The Data Stream Reference Module

In one configuration, the data stream reference module 224 analyzes artifacts, along with optional schema specifications of tables and views from the data model, and generates graphical images, such as a static web site, documenting all or part of the data stream, from database to reports, including internals of the reporting model. In one configuration, forward dependencies are displayed and followed by clicking hyperlinks, and backward dependencies by clicking selectable icons in the expressions that define objects. The selectable icons can be, for instance, hyperlinks and right-click menus (hereinafter "links").

The tree structure of the deeply branched reporting model tree can be navigated by (a) expanding or contracting individual branches to reach the leaves desired, (b) by hopping from one leaf to another (e.g., across branches) by following dependency links, (c) by hopping from a leaf to any of the lower branches to which it belongs, (d) by searching a variety of alphabetical indexes (e.g., by scrolling, jumping to sections, or by using the web browser Find in Page capability), or (e) by using third party web search engines applied to the specific web site.

Textual definitions of individual objects can be displayed, and the module can provide the capability to import and export these definitions into/from eXtended Markup Language (XML) specification of the reporting model. The resulting effect can be analogous to data dictionaries produced by data modeling tools.

In addition to step-by-step following of dependencies, the net effects of dependencies are available in other forms, such as (a) spreadsheets listing all pairings of database columns with dependent report items, (b) single page displays of chained expressions involved in the definition of a single report data item, and (c) at-a-glance tagging of all items in the reporting model. The latter feature distinguishes five degrees of report dependence, the highest being "reported" indicating that the item is referenced directly by at least one report, followed in degrees by "exposed" indicating that no current report references it but that it is available in the external user interface so that reports can include it selected by the user, "required" indicating that it is a lower level item supporting a reported item, "expected" indicating that it is a lower level item supporting an exposed item, and finally "optional" indicating that the item does not contribute in any way to the external interface and can be removed safely without any detrimental effect on the data analysis. Usage can be derived in a way that includes the indirect dynamic dependencies that are only meaningful in the context of a specific report query.

The module can provide both direct and indirect dependency relations. Dependency relations are determined by parsing the various inputs to identify objects and the object they reference. The relationships expressed in the reporting model are also parsed as individual objects, which in turn establish tentative usage dependencies between the objects mentioned in the original relationship object. All such relationship objects involving a particular parent object are collected into another artificial object known as the relationship list. When a report dependency reaches an object that depends on a relationship list, the relationship list is consulted to identify only those child objects (e.g., like foreign key references) that belong to other object collections (query subjects) involved in the current report query. Similarly, query subject filters are also parsed as separate objects and the other objects in that query are declared to depend on the filter object. The module 250 also includes tests to identify and prevent needless repetitions of dependencies. These methods reproduce the expectations of skilled reporting model authors as they understand the implications of the (frequently proprietary) query engines, so that useful dependency results can be derived without knowing the internal details of the query engines.

The presentation methods, which decide how to partition a, commonly large, reporting model into manageably sized images (e.g., web pages) follow the trunk of the tree outward towards the leaves until the branching ratio exceeds a predetermined threshold or until objects of certain determined types are found.

Presentation of the report structures include a method to identify the primary query among the many queries typically found in a particular report. These methods, together with the use of cooperating HyperText Markup Language (HTML) frames, allow the user to navigate through complex models with tens of thousands of objects without having to wait for long pages to download.

Figure 20:
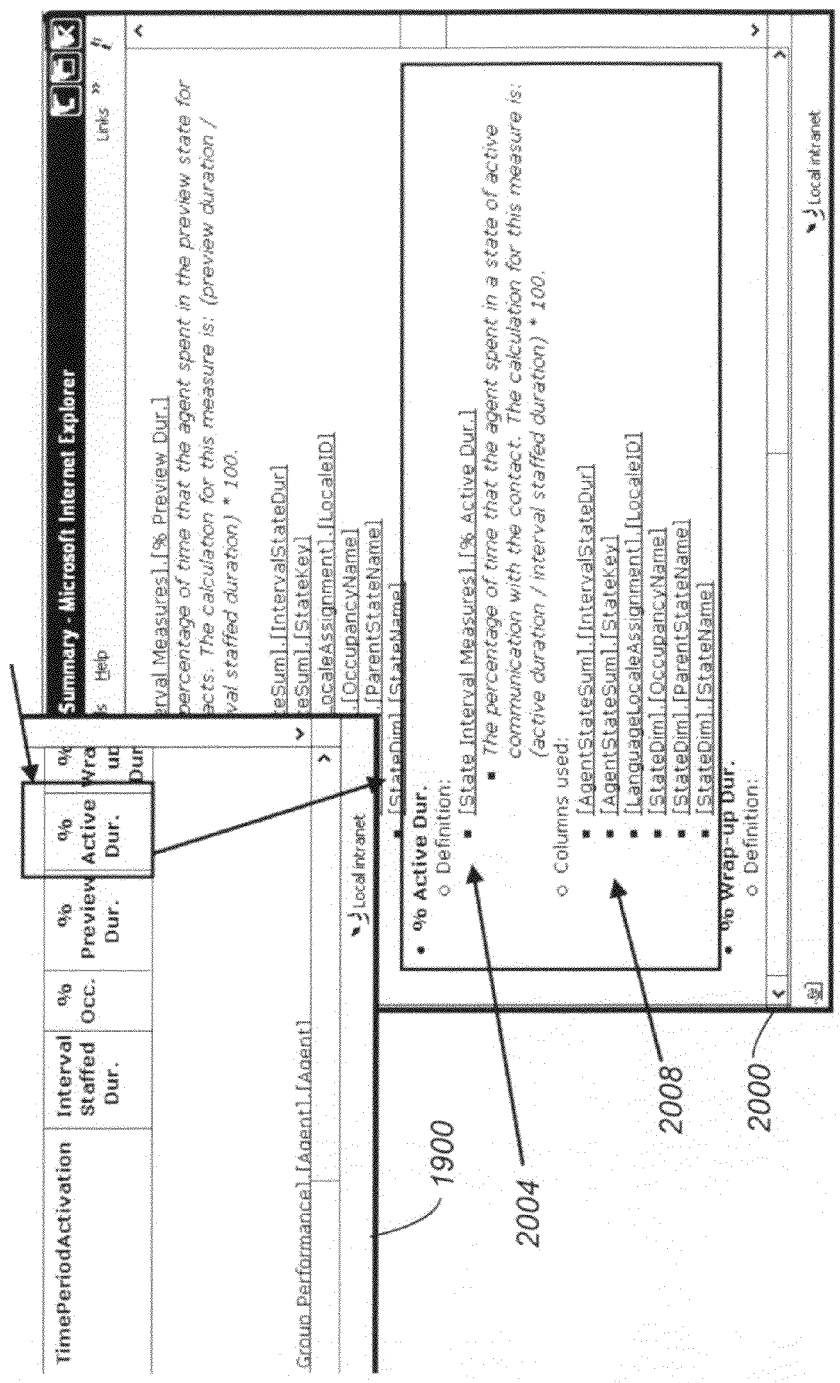
FIG. 20 is a screen shot according to an embodiment.
Figure 21:
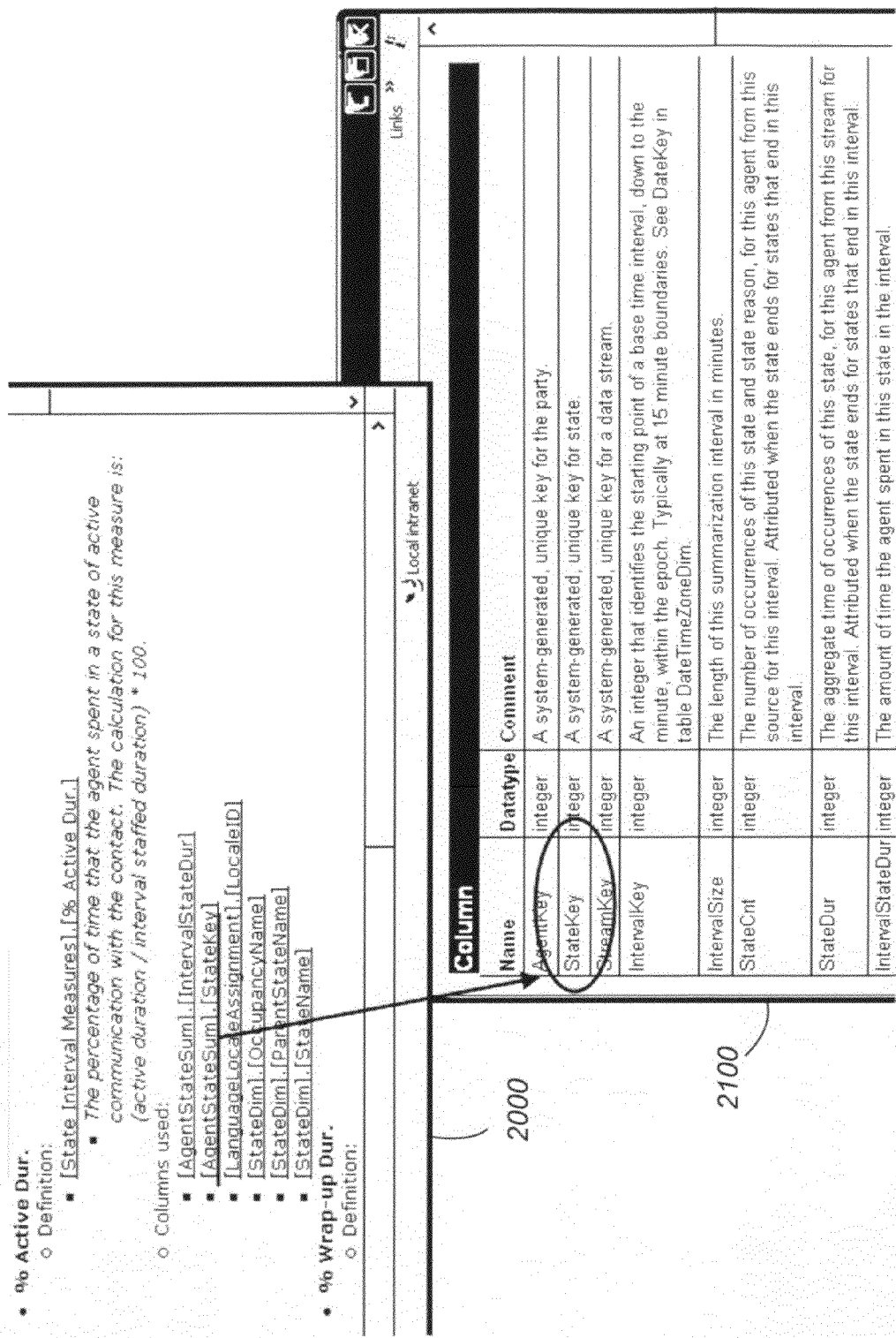
FIG. 21 is a screen shot according to an embodiment.
Figure 22:
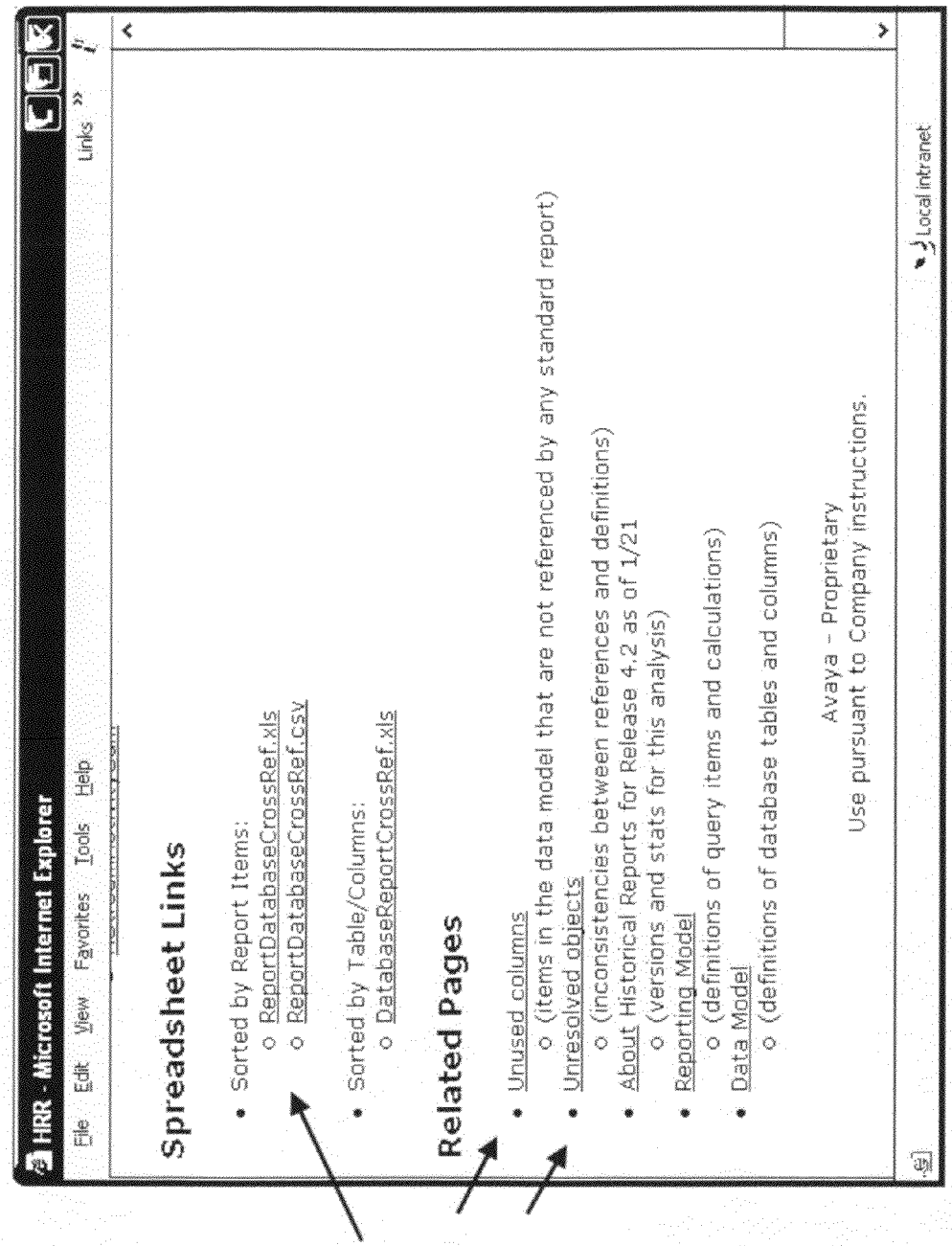
FIG. 22 is a screen shot according to an embodiment.

The operation of the data stream reference module 224 will be described with reference to FIGS. 3-23. FIGS. 4-17 correspond to the reporting model component. FIGS. 18-20 correspond to the report references component. FIGS. 21-23 correspond to the data models component.

Figure 3:
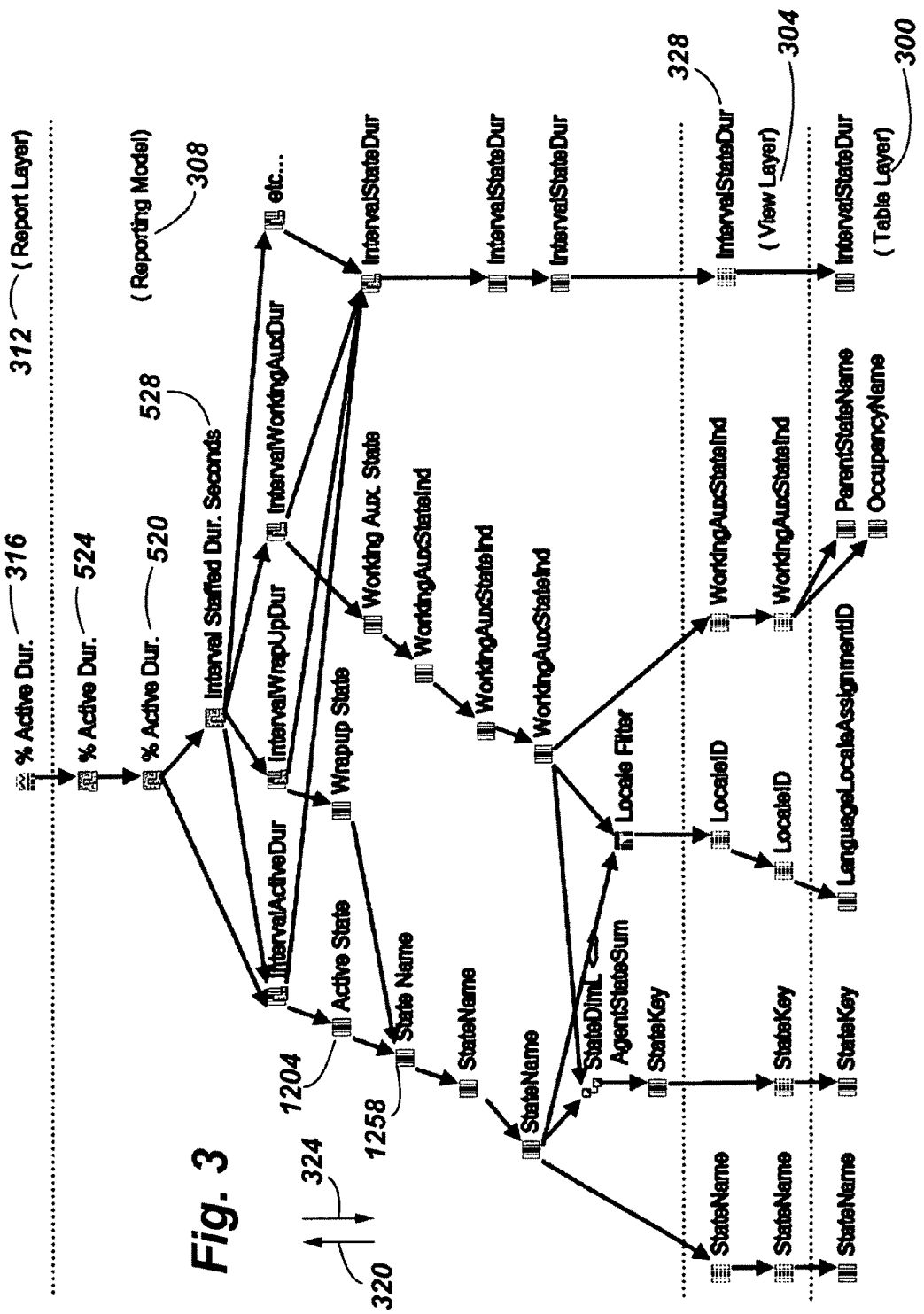
FIG. 3 is hierarchical diagram of a set of data dependencies according to an embodiment.

FIG. 3 depicts a plurality of hierarchically tiered data structures organized in a number of layers, namely the table layer 300 (which is at the database level), the view layer 304, the reporting model layer 308, and finally the report layer 312 (which is at the user presentation level). The variable % Active Dur. 316 is further related directly, from nearest to farthest levels, to Agent State Interval Measures (not shown), Measures at State Completion (not shown), Agent and Workgroup Measures (not shown), Composite Measures (not shown), Data Marts (not shown), and finally Model (not shown) (at the highest level).

Figure 4:
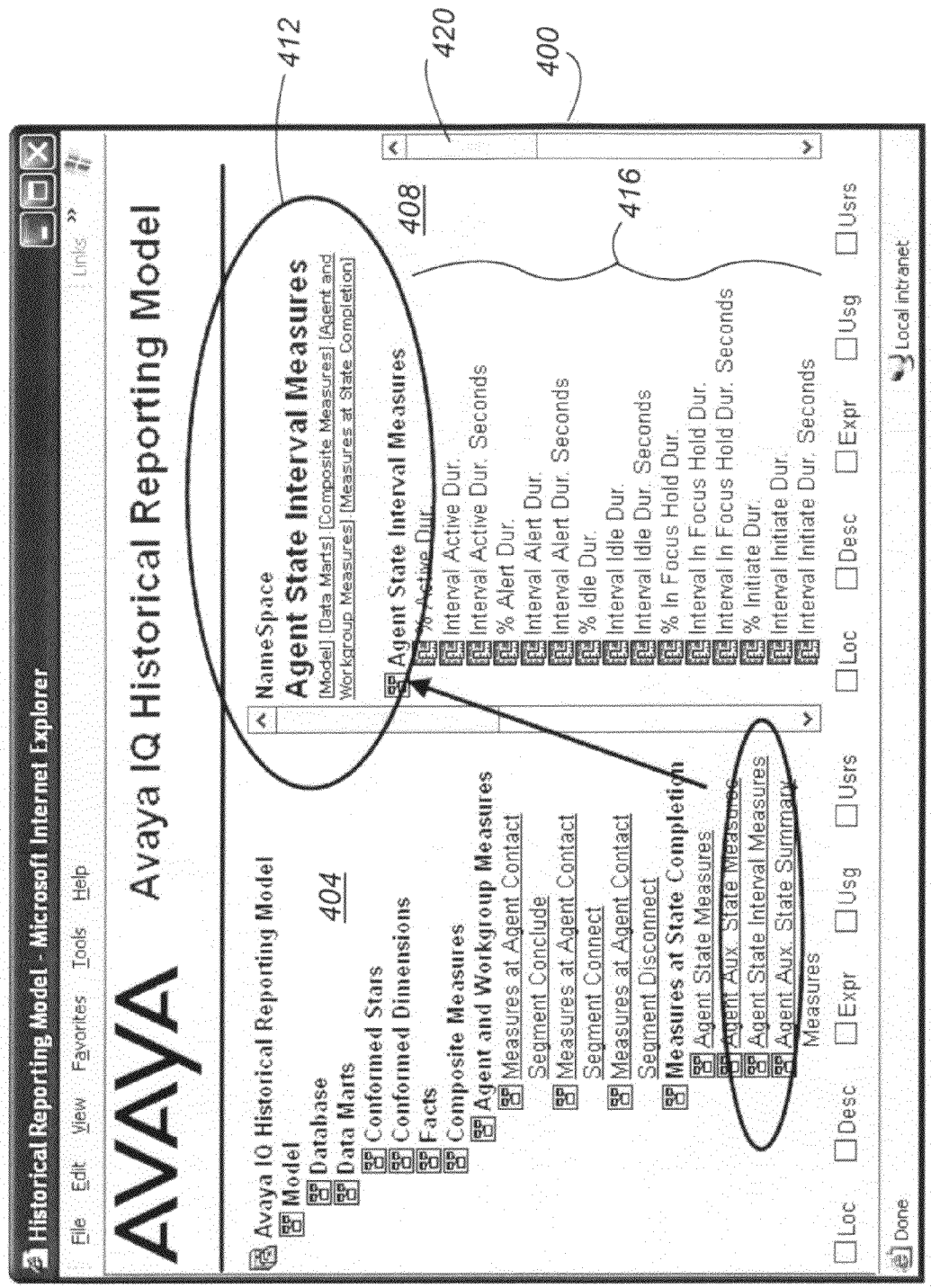
FIG. 4 is a screen shot according to an embodiment.

FIG. 4 is a first screenshot 400. The reporting model is organized as a tree hierarchy of namespaces and query subjects, culminating in individual calculations, filters, and query items. The screen shot 400 includes a left frame 404, which shows major tree branches, leading to details which are shown in the right frame 408. Hovering a cursor highlights an item, and clicking on a highlighted text item in the left frame 404 expands or contracts a branch of the tree. In the screen shot 404, the user has clicked on "Agent State Interval Measures". In the left frame 404, the hierarchical tree structure at levels above Agent State Interval Measures is depicted while in the right frame 408 the location 412 of Agent State Interval Measures is provided along with the various measures 416 themselves (which are the leaves of the selected tree branch). These are the objects at the next level below the level of Agent State Interval Measures. As shown by the scroll bar 420, a substantial number of measures are not shown in the screen shot. Along the bottom of the left and right frames 404 and 408 are a number of check boxes, which, if selected, show additional information across the items in the frame.

Figure 5:
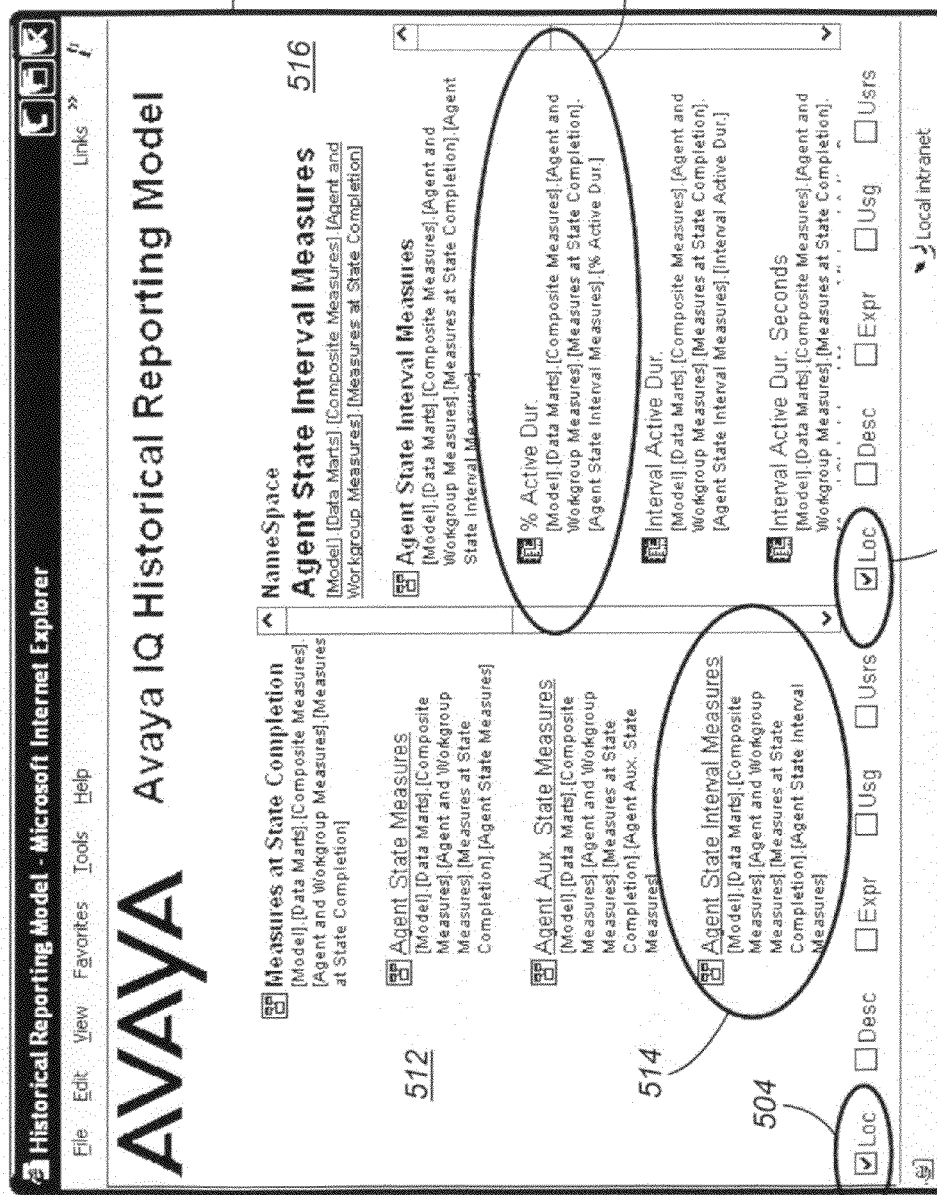
FIG. 5 is a screen shot according to an embodiment.

FIG. 5 is another screenshot 500 depicting a first check box, which corresponds to the location ("Loc") feature. This feature shows the location in the tree. Selecting the Loc checkboxes 504 and 508 in either or both of the left and right frames 512 and 516, respectively, shows the full path of each displayed item in the tree and provides a global location even in a narrow view. As shown by the oval 514, Agent State Interval Measures path, from highest to nearest level, is [Model].[Data Marts].[Composite Measures].[Agent and Workgroup Measures].[Measures at State Completion]. [Agent State Interval Measures] and by oval 518 % Active Dur. path, from highest to nearest level, is [Model].[Data Marts].[Composite Measures].[Agent and Workgroup Measures].[Measures at State Completion].[Agent State Interval Measures].[% Active Dur.]. With reference to FIG. 3, the %

Active Dur. is shown by reference number 520, and the [% Active Dur.] in the path is shown by reference number 524.

Figure 6:
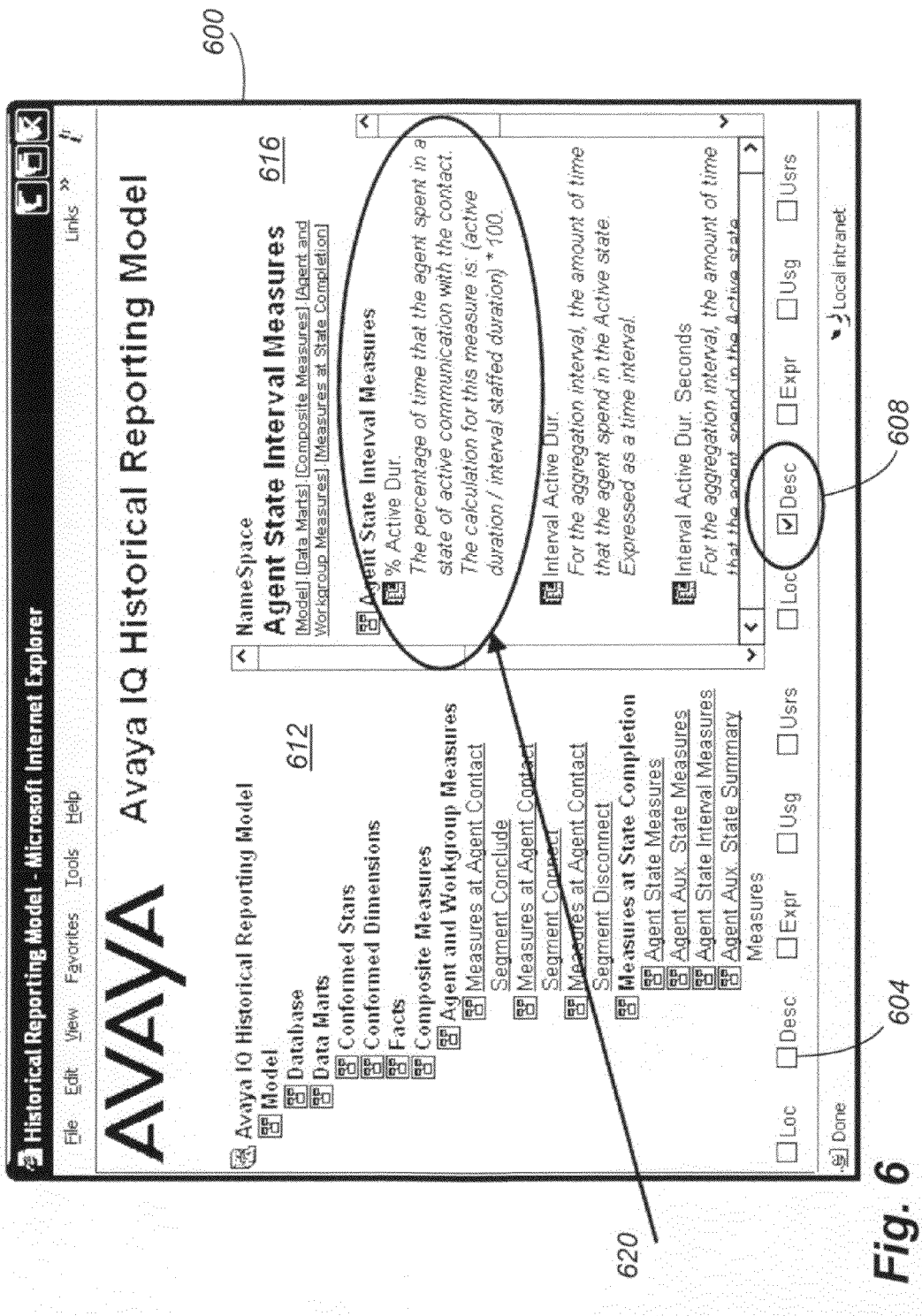
FIG. 6 is a screen shot according to an embodiment.

FIG. 6 is another screenshot 600 depicting a second check box, which corresponds to the description ("Desc") feature. Selecting the Desc checkboxes 604 and 608 in either or both of the left and right frames 612 and 616, respectively, shows the descriptions of the various displayed items. As shown by oval 620, the definition of % Active Dur. 520 is the percentage of time that the agent spent in a state of active communication with the contact, as provided by the calculation (active duration/interval staffed duration)*100.

Figure 7:
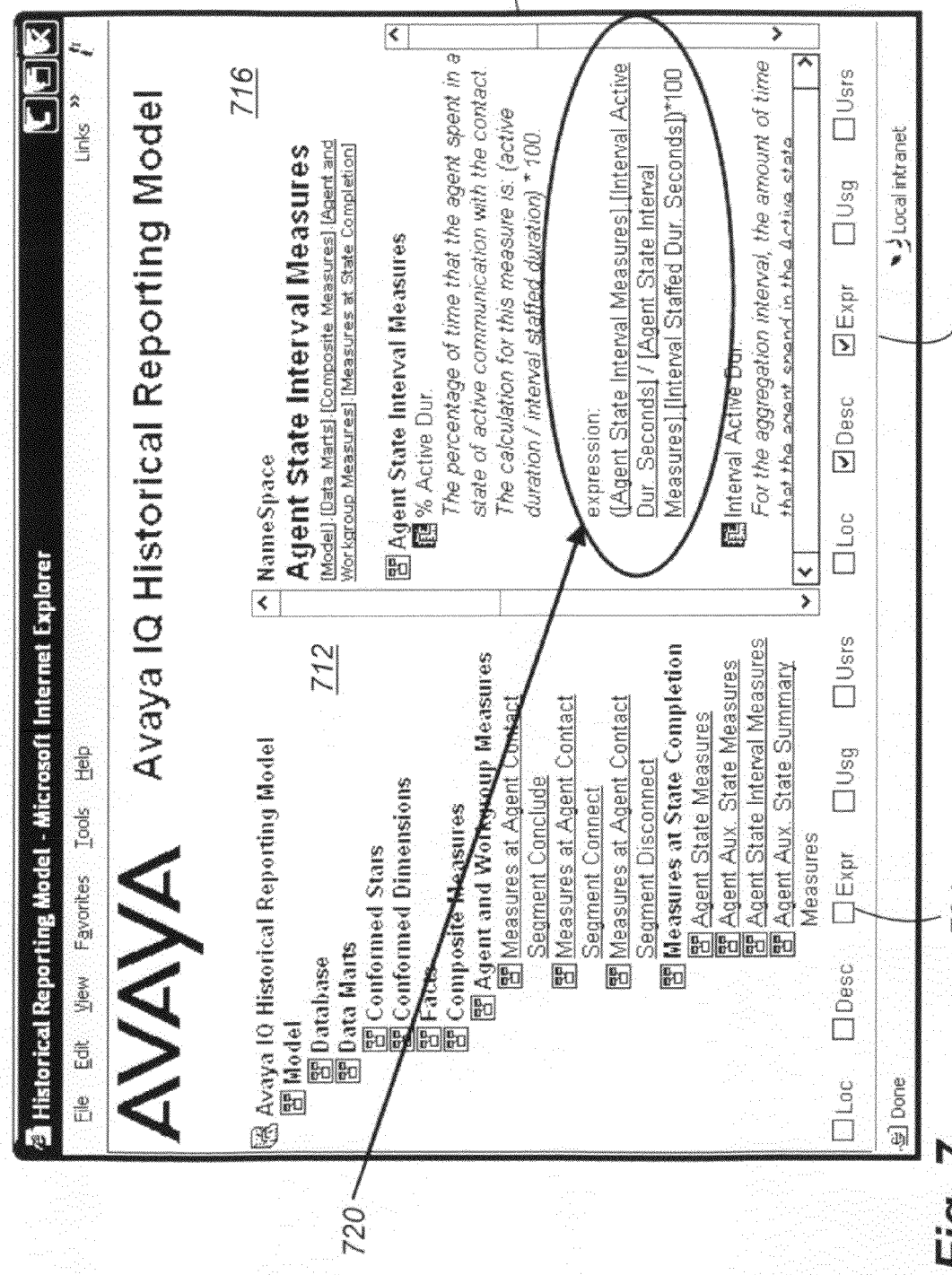
FIG. 7 is a screen shot according to an embodiment.

FIG. 7 is another screenshot 700 depicting a third check box, which corresponds to the expression ("Expr") feature. Selecting the Expr checkboxes 704 and 708 in either or both of the left and right frames 712 and 716, respectively, shows the displays the expressions that define the various displayed items. As shown by oval 720, the mathematical expression for % Active Dur. 520 is ([Agent State Interval Measures].[Interval Active Dur. Seconds]/[Agent State Interval Measures]. [Interval Staffed Dur. Seconds])*100. Selecting both the description and expression features allows an easy comparison. The items referenced in the expression provide links to the corresponding item and, as discussed below, can be used for back tracing.

Figure 8:
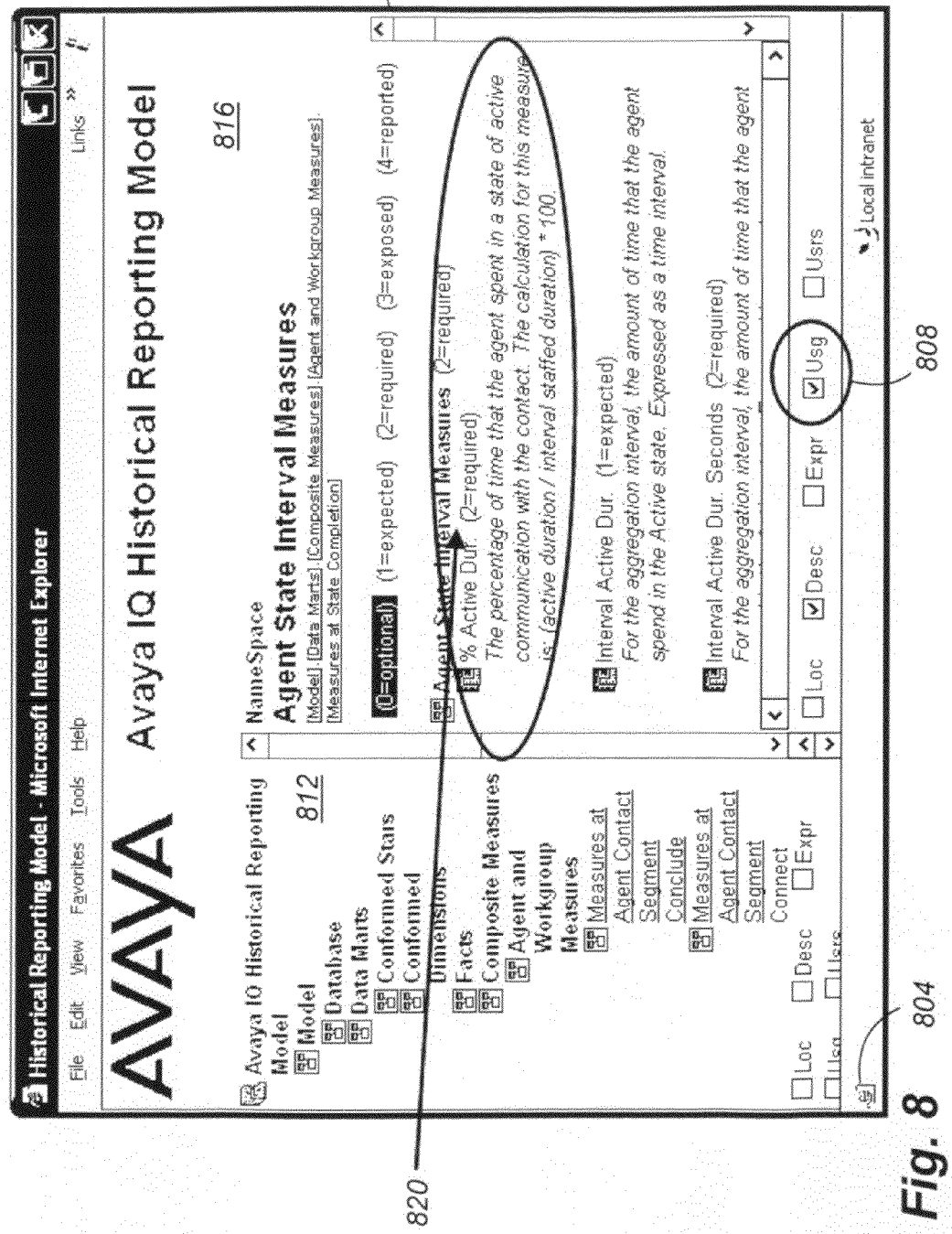
FIG. 8 is a screen shot according to an embodiment.

FIG. 8 is another screenshot 800 depicting a fourth check box, which corresponds to the usage ("Usg") feature. Selecting the Usg checkboxes 804 and 808 in either or both of the left and right frames 812 and 816, respectively, displays the degree to which each item is used by, or exposed to, reports. There are five possibilities, namely reported, exposed, required, expected, and optional. Each possibility is associated with a differently colored background. As shown by oval 820, % Active Dur. 520 is required for support of other items that are used in current reports but is not itself used directly in any report nor even exposed to users for potential use in a report.

Figure 9:
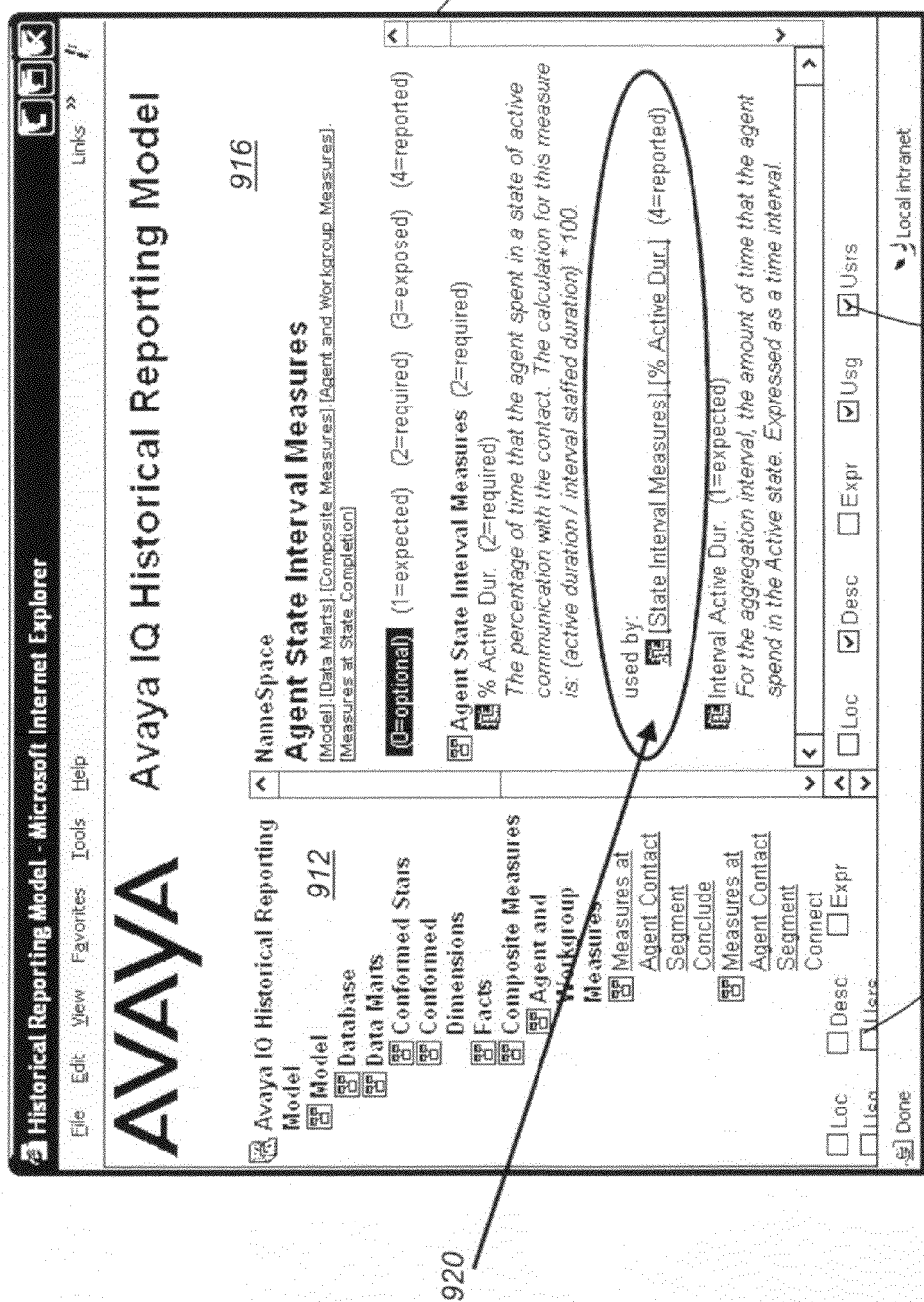
FIG. 9 is a screen shot according to an embodiment.

FIG. 9 is another screenshot 900 depicting a fifth check box, which corresponds to the users ("Usrs") feature. Selecting the Usrs checkboxes 904 and 908 in either or both of the left and right frames 912 and 916, respectively, lists all items that use a selected item. As shown by oval 920, % Active Dur. 520 is used by [State Interval Measures].[% Active Dur.] (which is shown by reference number 524). As discussed below, this feature is useful for performing forward tracing.

Figure 10:
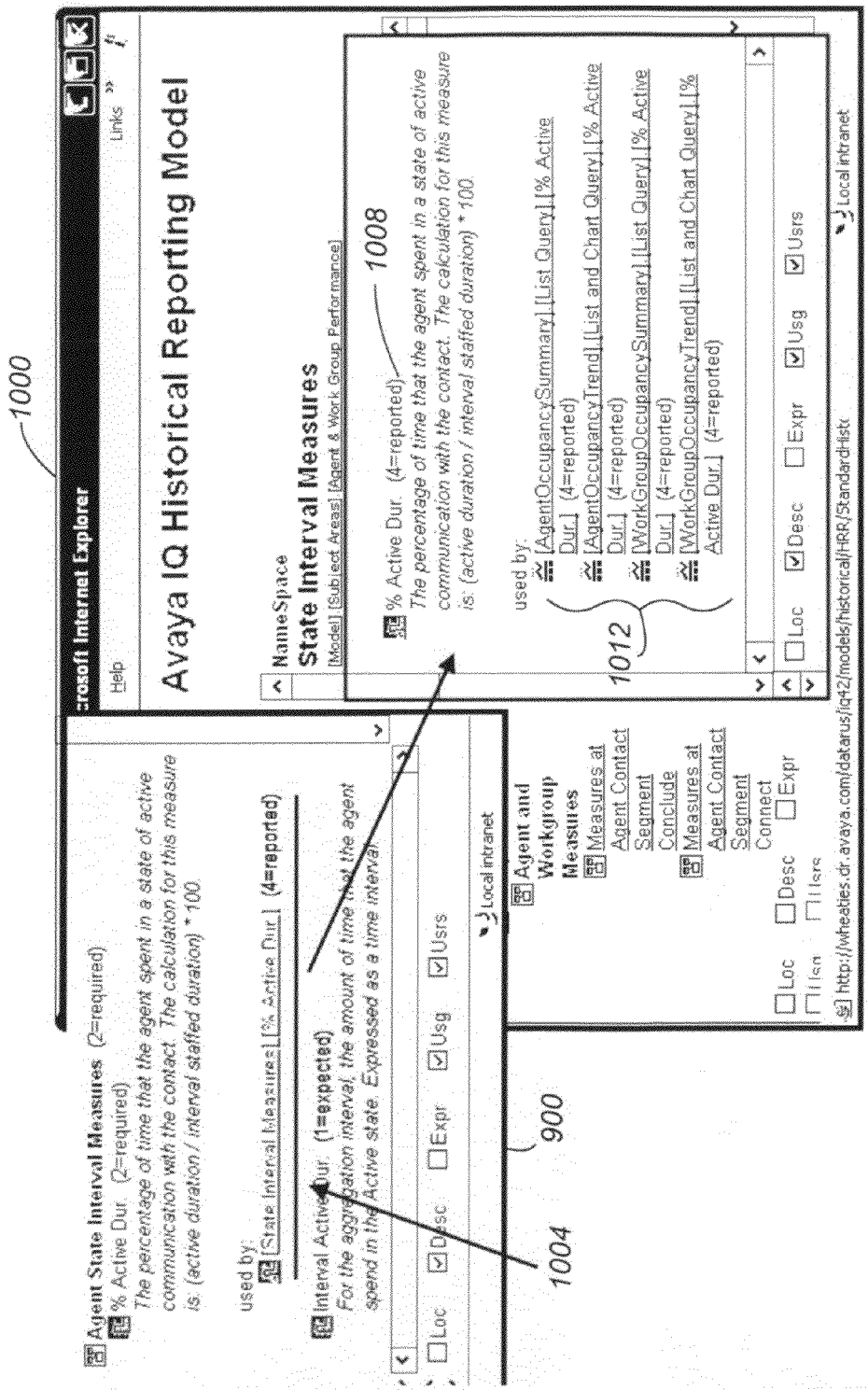
FIG. 10 is a screen shot according to an embodiment.
Figure 11:
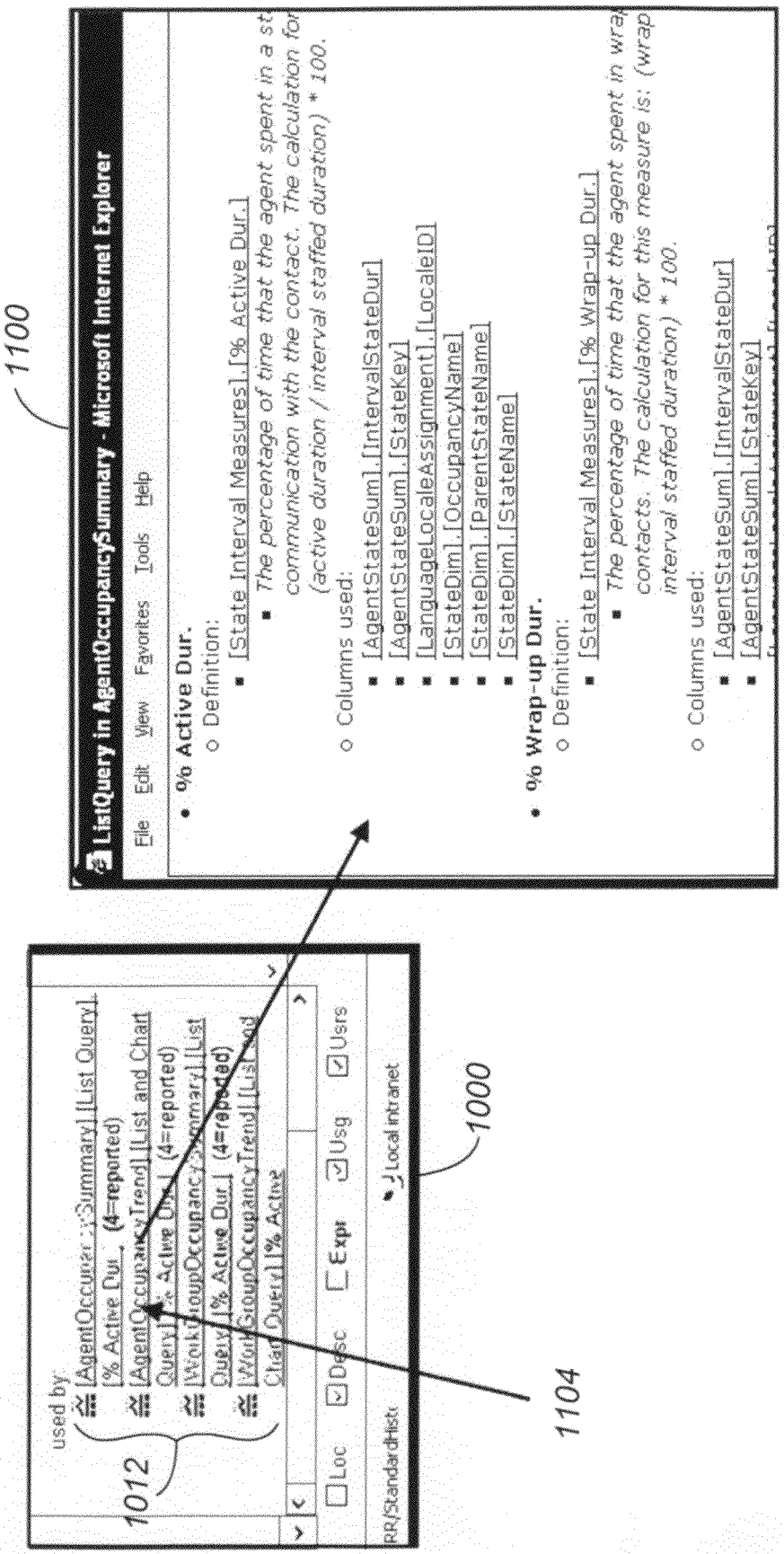
FIG. 11 is a screen shot according to an embodiment.

FIGS. 10-11 provide an example of forward tracing. FIG. 10 is a screenshot 1000 with an overlay of the screenshot 900 of FIG. 9. The user has selected the item [State Interval Measures].[% Active Dur.] 1004, which caused the next screenshot 1000 to be provided to the user. In the screenshot 1000, the item 1008 (which has the same name as % Active Dur. 520 but in a different namespace) is shown, with its list of users. The users correspond to reports of which four 1012 are shown in the example. In FIG. 11, the user has selected the item [Agent Occupancy Trend].[List and Chart Query].[% Active Dur.] 1104 and caused the next screenshot 1100 to be presented to the user. The screenshot 1100 is a page for the report selected. The page is from the report references component.

Figure 12:
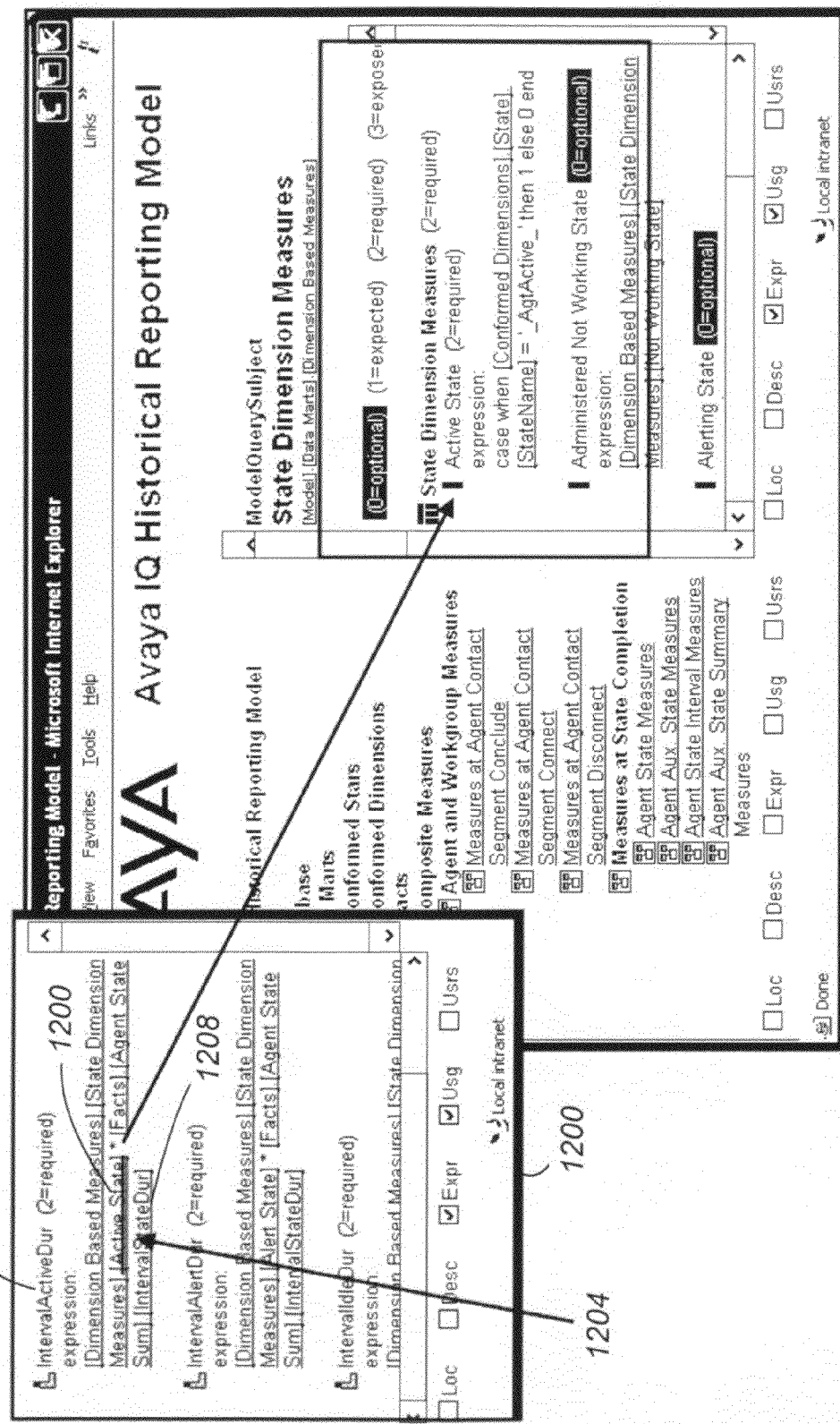
FIG. 12 is a screen shot according to an embodiment.
Figure 13:
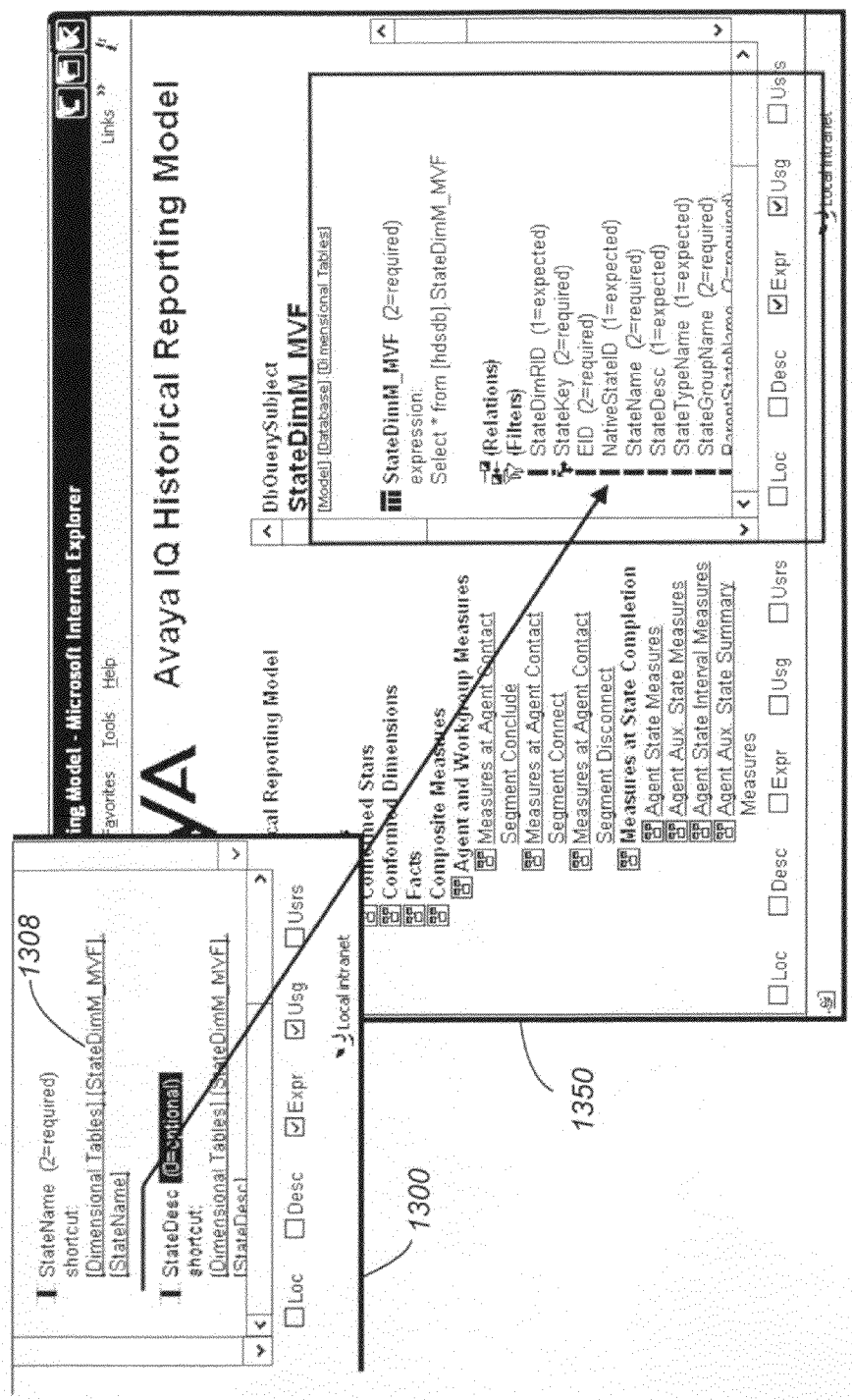
FIG. 13 is a screen shot according to an embodiment.

FIGS. 12-13 provide an example of back tracing towards the database. FIG. 12 shows first and second screenshots 1200 and 1250. The user started in the screenshot 700 and selected the denominator expression [Agent State Interval Measures] .[Interval Staffed Dur. Seconds] 528 (FIG. 3), which provided a further screenshot (not shown). One of the items in the further screenshot in the expression for the selected denominator expression is [Facts].[Agent State Sum].[IntervalActiveDur.] 532. The user then selected item 532, which produced the first screenshot 1200. In the first screenshot 1200, the user has selected in the right frame the Expr and Usg features and the item [Dimension Based Measures].[State Dimension Measures].[Active State] 1204 in the mathematical expression, which caused the second screenshot 1250 to be presented to the user. In the second screenshot 1250, the expression for the item 1204 is provided. The user then selects, in the expression, the item [Conformed Dimensions] .[State].[StateName] 1258, which causes another screenshot (not shown) to be presented to the user. In this screenshot, the user next selects, in the expression for item 1258, the item [Dimensions].[StateL] (not shown), which provides yet another screenshot 1300 to the user. In that screenshot 1300, the user selects, in the expression for [Dimensions].[StateL]. [StateName], the item [Dimensional].[Tables].[StateDimM_MVF].[StateName] 1308, which generates the screenshot 1350. As shown in screenshot 1350, the user has back traced from the item 1204 to a database query subject 1320 (in the view layer 304) that queries 1324 a materialized view of the state dimension StateDimM_MVF in the database.

In another back tracing example, the user selects, in the expression for IntervalActiveDur 1202, the item [Facts]. [Agent State Sum].[IntervalStateDur.]1208, which generates a further screenshot. In this screenshot, the user selects, in the expression for item 1208, the item [Dimensional Tables]. [AgentStateSum].[IntervalStateDur] 328, which provides yet another screenshot, describing, in the expression for [Dimensional Tables].[AgentStateSum].[IntervalStateDur], a database query subject that queries the view [AgentStateSum] (in the view layer 304) that queries a summary fact table in the database.

Figure 14:
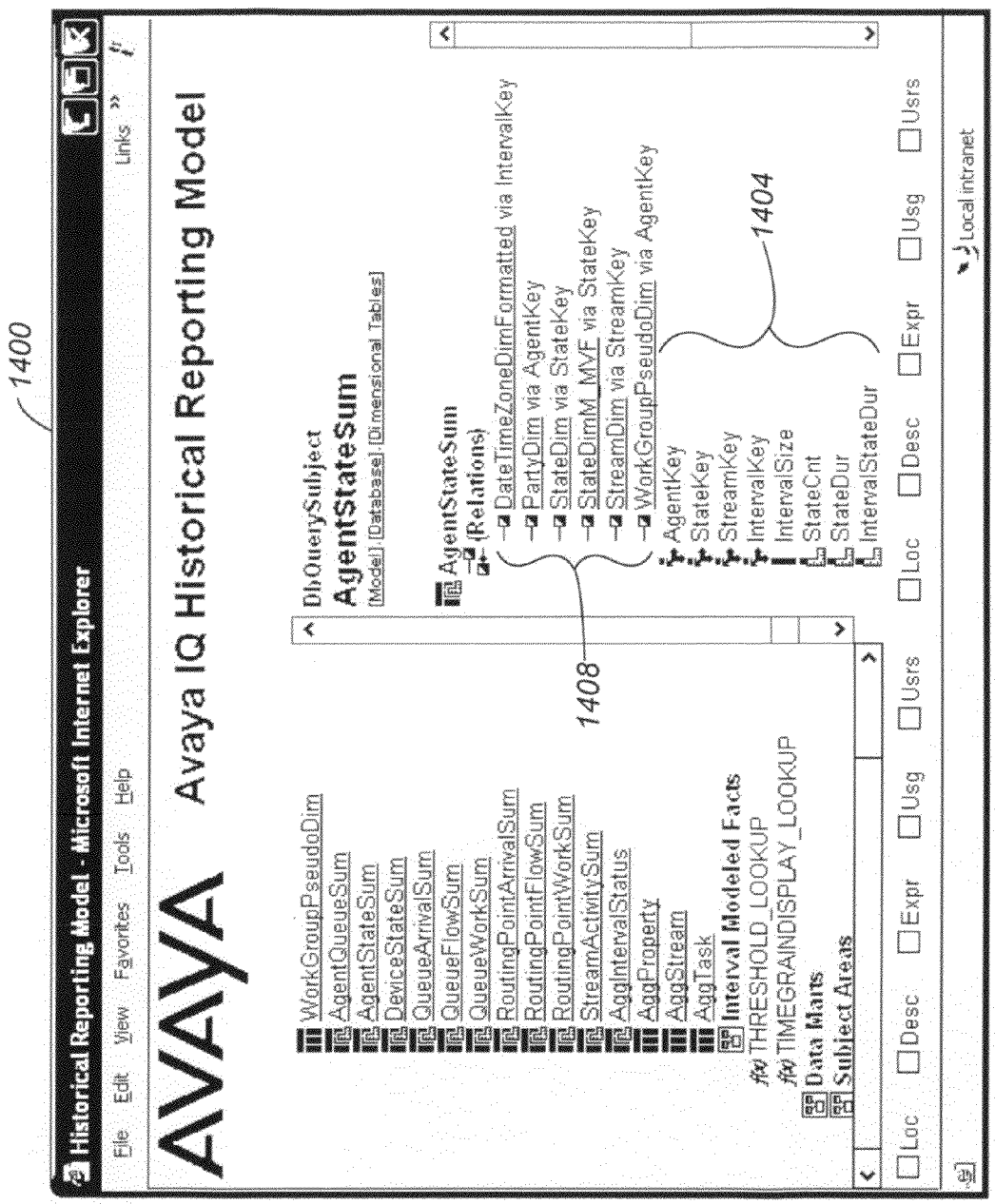
FIG. 14 is a screen shot according to an embodiment.

FIG. 14 is a screenshot 1400 derived from this final screenshot in which the user has selected relations as the final screenshot shows that the query is pulling data from both a fact table and a dimension. In the screenshot 1400, the items 1404 refer to columns in a fact table. Relations refer to primary and/or foreign keys to one or more dimension tables. The user has selected and expanded relations to provide a listing 1408 of the keys to one or more dimension tables. In the example shown, the keys are IntervalKey, AgentKey, StateKey, StateKey, StreamKey, and AgentKey and the corresponding dimension tables are DateTimeZoneDimFormatted, PartyDim, StateDim, StateDimM_MVF, StreamDim, and WorkGroupPseudoDim, respectively.

Figure 15:
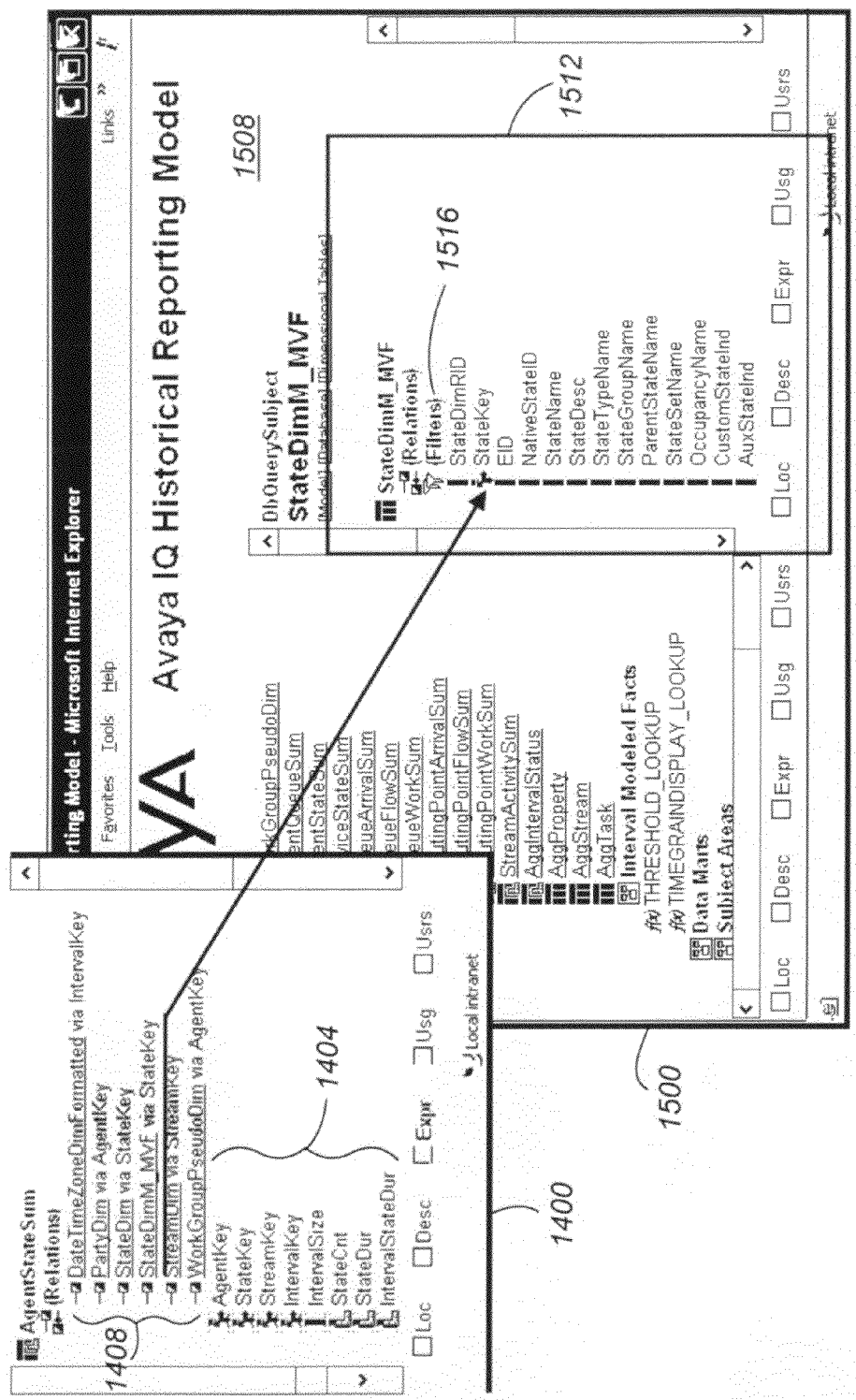
FIG. 15 is a screen shot according to an embodiment.

FIG. 15 is an overlay of screenshot 1400 on a further screenshot 1500 generated by the user selecting the relation StateDimM_MVF via StateKey 1504. The corresponding entry 1512 in the right frame 1508 of the screenshot 1500 provides the columns of the dimension table StateDimM_MVF and further relations to one or more fact tables and filters.

Figure 16:
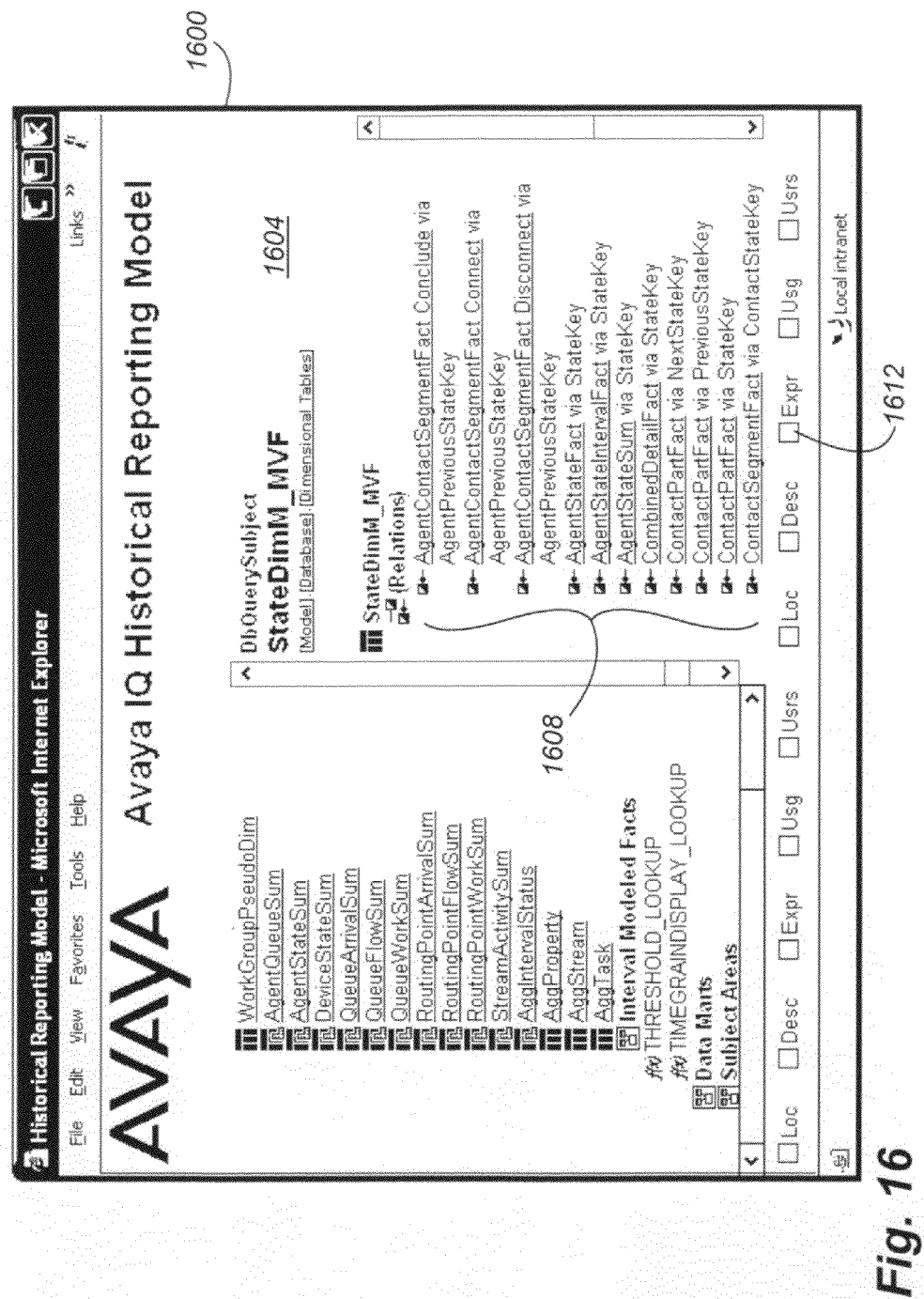
FIG. 16 is a screen shot according to an embodiment.

Selecting the relations in screenshot 1500 yields the screenshot 1600 of FIG. 16. The right frame 1604 of this screenshot 1600 provides a listing 1608 of the fact tables that reference, by a key, the dimension table StateDimM_MVF. This list includes the fact table AgentStateSum table previously referenced in screenshot 1400. Selecting, in screenshot 1600, the Expr checkbox 1612 provides the "where" clause that expresses the relationship. This "where" clause is [Dimensional Tables].[StateDimM_MVF].[StateKey]=].[Dimensional Tables].[AgentStateSum].[StateKey]. The inference is that anything pulled from the dimension [Dimensional Tables].[StateDimM_MVF] when joining with the fact table [Dimensional Tables].[AgentStateSum] depends on the StateKey in the fact table.

Figure 17:
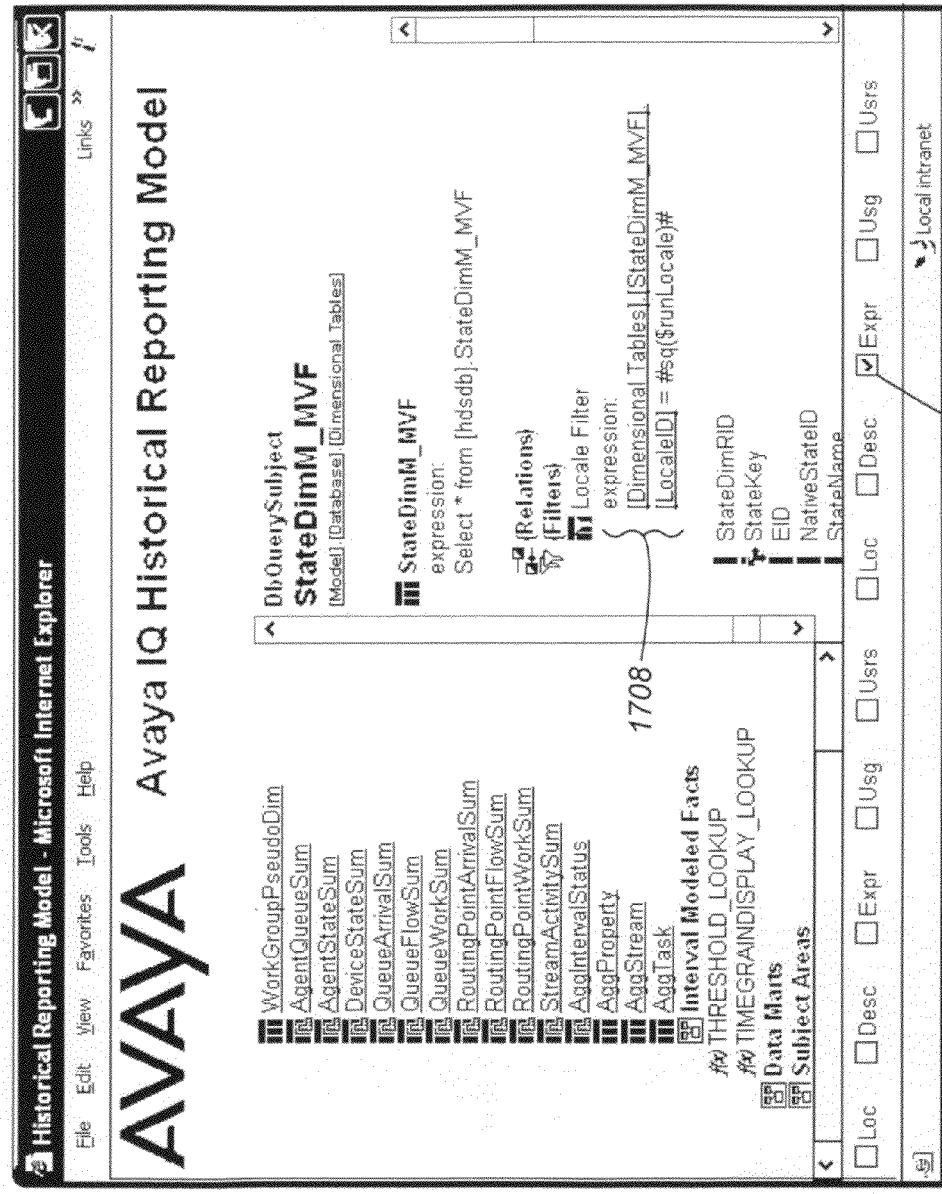
FIG. 17 is a screen shot according to an embodiment.
Figure 18:
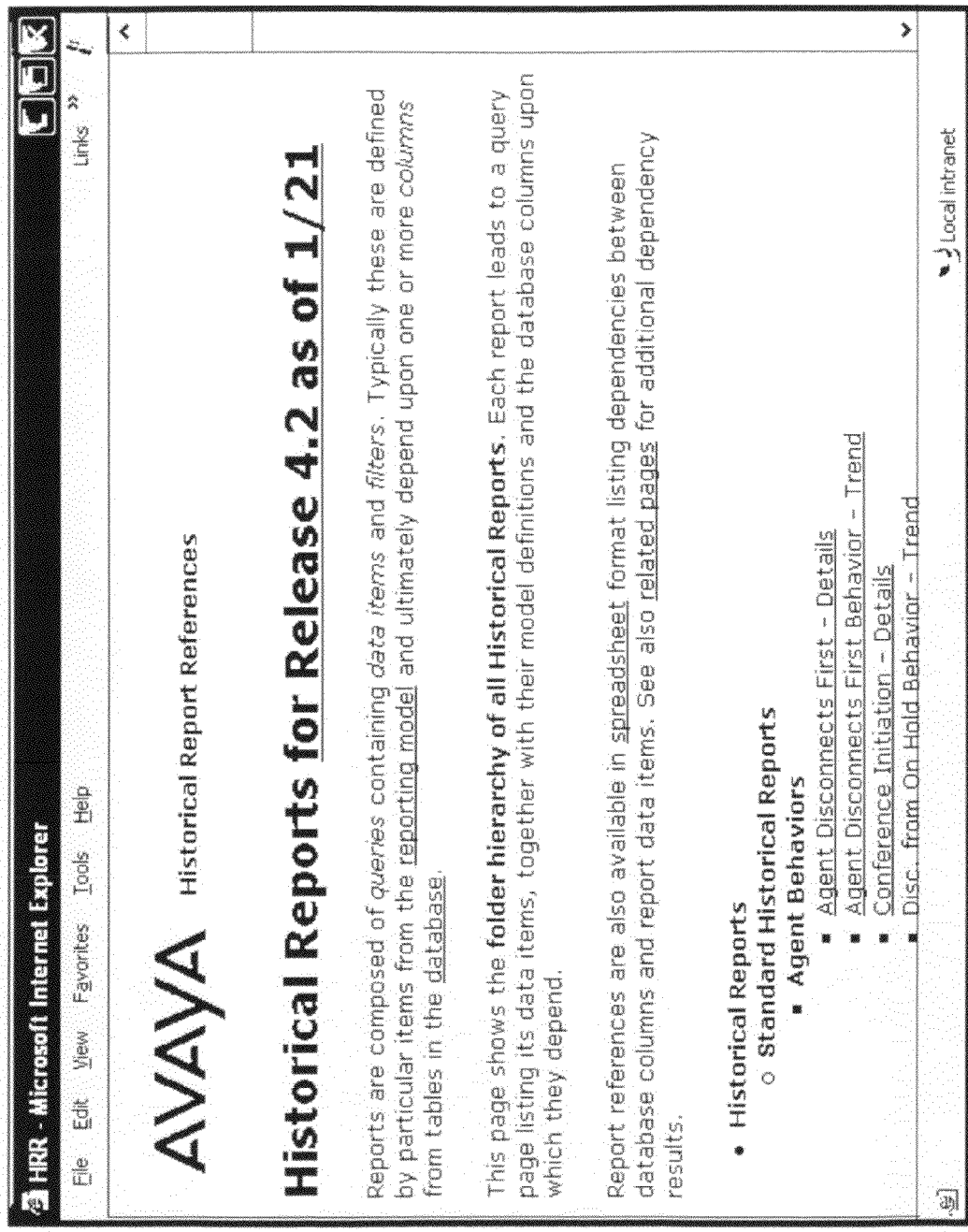
FIG. 18 is a screen shot according to an embodiment.

FIG. 17 is a screenshot 1700 generated by selecting, in screenshot 1500, the filters option 1516 and selecting the Expr checkbox 1704. Filters refer to conditional relationships between a selected dimension and fact or selected fact and dimension. By expanding the filters option, the user has discovered a locale filter having a corresponding expression 1708. Based on the expression, what is pulled from StateDimM_MVF depends on the items in the filter expression [Dimensional Tables].[StateDimM_MVF].[LocaleID].

With reference to FIGS. 18-23, determining item dependencies in nonadjacent layers will now be described. Instead of wading through the details of the reporting reference component, the user can return to the main page of the data stream reference module 250 and open the report references component. As shown in FIG. 18, the resulting screenshot 1800 lists all reports and the items they query. The user then selects one of the reports, the agent occupancy summary report (not shown), to provide the screenshot 1900 of FIG. 19. Screenshot 1900 provides the database columns each item in the selected report depends from, thereby permitting the selected report to trace its dependencies back through the reporting model to tables and columns in the database. As shown by box 1904, the screenshot 1900 displays all the items in the main report query.

FIG. 20 shows screenshot 1900 overlaid on a further screenshot 2000. As shown in screenshot 1900, the user has selected % Active Dur., which caused the generation of screenshot 2000. Each item shows its reporting model definition 2004, and the database columns 2008 on which it depends. By clicking on a selected definition link in screenshot 2000, the user can jump back into the reporting model (e.g., to explore the details and context of the definition.

FIG. 21 shows screenshot 2000 overlaid on a further screenshot 2100. As shown in screenshot 2000, the user has selected [AgentStateSum].[StateKey], which produced screenshot 2100. Screenshot 2100 is a listing of the various database columns and their respective definitions, in particular the definition of [StateKey] in the data model.

Referring again to FIG. 3, from the report item at the top (% Active Dur. 316), the user can select, in its definition, % Active Dur. 524 to jump back into the reporting model or a selected one of its columns used in the Table Layer 300 to move to the data model definitions.

The module 224 can provide other forms of dependency information.

FIG. 22 is a screenshot 2200 of the bottom of the report reference main page. Options listed include spreadsheets, unused columns, unresolved items, and version information and links to other parts of the data stream reference module 250. Spreadsheet links sort by report items or table/columns. Unused columns refer to items in the data model that are not referenced by any standard report. Unresolved objects are inconsistencies between references and definitions. Version information and links to other parts of the data stream reference refer to historical reports for release 4.2 (versions and statistics for analysis), the reporting model (definitions of query items and calculations), and data model (definitions of database tables and columns).

With reference to FIG. 23, a screenshot 2300 provides a spreadsheet listing all pairings of report items 2304 and their respective database columns 2308. The listings can be pre-sorted by report but other sortings are also possible. For example, the spreadsheet can be sorted first by table and column then item. For example, screenshot 2400 of FIG. 24 is a spreadsheet configured to show all report items that depend from a selected item, namely IntervalStateDur. This spreadsheet further shows that no report items depend on IntervalSize. The various sorts can readily permit forward or back tracing, as desired.

The exemplary systems and methods of this invention have been described in relation to a data warehouse in a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the data stream reference module is applied with other types of data structures, such as object oriented and relational databases.

In another alternative embodiment, the data stream reference module is applied in architectures other than contact centers, such as workflow distribution systems.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method:
   providing a database defined by a data model, a metadata model comprising descriptive information, the descriptive information defining transformations and rules to convert raw data in the database to selected output, and a query engine to construct, based on user input and the descriptive information, one or more of: appropriate queries and commands to the database, wherein the data model and the metadata model collectively define a hierarchical dependency structure representable as a directed acyclical graph;
   to assist a user in interacting with a query model and determine one or more of dependencies of items in a report and dependencies of items in a database, displaying a plurality of images to the user, the plurality of images being linked together and providing a usage mode that comprises displaying a first display, the first display comprising, for a selected first item, an indicator of a degree to which the selected first item is used in at least one of preparation of and incorporated in a report;
   forward tracing from the selected first item in a first level of the directed acyclical graph to a second item in a second level of the directed acyclical graph, the second item depending upon the first item, by selecting a second link in a first image, the second link being associated with the second item and, in response, providing the user with a second image containing, in turn, one or more of a definition and dependency information respecting the second item; and
   back tracing from a selected third item in a second level of the directed acyclical graph to a fourth item in a first level of the directed acyclical graph, the selected third item being dependent upon the fourth item, by selecting a third link in a second image, the third link being associated with the fourth item and, in response, providing the user with a third image containing, in turn, the definition and or dependency information respecting the fourth item, and wherein at least one of the following substeps is performed:
providing a plurality of the following operating modes:
in a users mode, providing a second display to the user, the second display comprising, for the selected first item, a listing of items using the selected first item;
in a location mode, providing a third display to the user, the third display including, for the selected first item and or any other items shown, the complete location of said item(s) within the hierarchical tree structure in the layers of the reporting system;
in an expression mode, displaying, to the user, a mathematical algorithm used to determine the selected first item, the mathematical algorithm referencing links to other items in the directed acyclical graph;
in a description mode, displaying, to the user, a textual definition of the selected first item, the textual definition being importable and exportable into a markup language specification of a reporting model; and
in other modes, providing the user with a plurality of: spreadsheets listing pairings of database columns with dependent items, single-page displays of chained items involved in a definition of a single report data item, and tagging of items in a reporting model;
providing the user with a series of displays, the displays permitting the user to move directly from a first item in a first dependency chain to a second item in a second, different dependency chain;
selecting a fifth link leading to the relations of a fifth item in a fifth image to obtain a sixth image comprising a plurality of items related through foreign key(s) to the fifth item and comprising a seventh link to a seventh image, the seventh image containing, in turn, the definition and or dependency information representing an item related to the fifth item through a foreign key relation;
selecting an eighth link leading to the filters for an eighth item in an eighth image to obtain a ninth image comprising a plurality of filter identifiers associated with the eighth item, which is expanded to reveal a ninth item in the definition of that filter and comprising a ninth link to a tenth image, the tenth image containing, in turn, the definition and or dependency information for the ninth item; and
providing an eleventh image listing a plurality of output reports, each output report identifier corresponding to a respective image comprising a set of items in the corresponding report, each item in turn having a respective link to a respective image, the respective image comprising at least one of a definition of the corresponding identified item and a set of database columns on which the corresponding identified item depends.

2. The method of claim 1, wherein the first level is not adjacent to the second level.

3. The method of claim 1, wherein the providing the plurality of operating modes is performed.

4. The method of claim 3, wherein the first level is not adjacent to the second level.

5. The method of claim 4, wherein the plurality of operating modes includes the usage mode.

6. The method of claim 4, wherein the plurality of operating modes includes the users mode.

7. The method of claim 4, wherein the plurality of operating modes includes the location mode.

8. The method of claim 4, wherein the plurality of operating modes includes the expression mode.

9. The method of claim 4, wherein the plurality of operating modes includes the description mode.

10. The method of claim 4, wherein the plurality of operating modes includes the other modes.

11. The method of claim 1, wherein the providing the user with the series of displays is performed.

12. The method of claim 1, wherein the selecting a fifth link leading to the relations of a fifth item is performed.

13. The method of claim 1, wherein in at least one image of a displayed item identifier is identified as being one of reported (indicating that the displayed item is referenced directly by at least one output report), exposed (indicating that no current output report references the displayed item but that the displayed item is available in the external user interface so that output reports can include the displayed item if selected by the user), required (indicating that the displayed item is a lower level item supporting a reported item reported by an output report), expected (indicating that the displayed item is a lower level item supporting an exposed item), and optional (indicating that the displayed item does not contribute in any way to the external interface and can be removed safely without any detrimental effect on the data analysis).

14. The method of claim 1, wherein a user can select in at least one image a plurality of the following options: location (which shows a hierarchical tree location of the corresponding displayed item), description (which provides a definition of the corresponding displayed item), expression (which provides mathematical expression used to determine the corresponding displayed item), usage (which displays the degree to which the corresponding displayed item is one or more of: used by reports and exposed to reports), and users (which displays a set of items using the corresponding displayed items).

15. A non-transitory computer readable medium comprising processor executable instructions that when executed by a processor are configured to perform steps comprising:
providing a database defined by a data model, a metadata model comprising descriptive information, the descriptive information defining transformations and rules to convert raw data in the database to selected output, and a query engine to construct, based on user input and the descriptive information, one or more of: appropriate queries and commands to the database, wherein the data model and the metadata model collectively define a hierarchical dependency structure representable as a directed acyclical graph;
to assist a user in interacting with t-he-a query model and determine one or more of dependencies of items in a report and dependencies of items in a database, displaying a plurality of images to the user, the plurality of images being linked together and providing a usage mode that comprises displaying a first display, the first display comprising, for a selected first item, an indicator of a degree to which the selected first item is at least one of used in preparation of and incorporated in a report;
forward tracing from a selected first item in a first level of the directed acyclical graph to a second item in a second level of the directed acyclical graph, the second item depending upon the first item, by selecting a second link in a first image, the second link being associated with the second item and, in response, providing the user with a second image containing, in turn, one or more of: a definition and dependency information respecting the second item; and back tracing from a selected third item in a second level of the directed acyclical graph to a fourth item in a first level of the directed acyclical graph, the selected third item being dependent upon the fourth item, by selecting a third link in a second image, the third link being associated with the fourth item and, in response, providing the user with a third image containing, in turn, the definition and or dependency information respecting the fourth item, and wherein at least one of the following substeps is performed:

providing at least one of the following operating modes:
in a users mode, providing a second display to the user, the second display comprising, for the selected first item, a listing of items using the selected first item;
in a location mode, providing a third display to the user, the third display including, for the selected first item and or any other items shown, the complete location of said item(s) within the hierarchical tree structure in the layers of the reporting system;
in an expression mode, displaying, to the user, a mathematical algorithm used to determine the selected first item, the mathematical algorithm referencing links to other items in the directed acyclical graph;
in a description mode, displaying, to the user, a textual definition of the selected first item, the textual definition being importable and exportable into a markup language specification of a reporting model; and
in other modes, providing the user with a plurality of: spreadsheets listing pairings of database columns with dependent items, single-page displays of chained items involved in a definition of a single report data item, and tagging of items in a reporting model;
providing the user with a series of displays, the displays permitting the user to move directly from a first item in a first dependency chain to a second item in a second, different dependency chain;
selecting a fifth link leading to the relations of a fifth item in a fifth image to obtain a sixth image comprising a plurality of items related through foreign key(s) to the fifth item and comprising a seventh link to a seventh image, the seventh image containing, in turn, the definition and or dependency information representing an item related to the fifth item through a foreign key relation;
selecting an eighth link leading to the filters for an eighth item in an eighth image to obtain a ninth image comprising a plurality of filter identifiers associated with the eighth item, which is expanded to reveal a ninth item in the definition of that filter and comprising a ninth link to a tenth image, the tenth image containing, in turn, the definition and or dependency information for the ninth item; and
providing an eleventh image listing a plurality of output reports, each output report identifier corresponding to a respective image comprising a set of items in the corresponding report, each item in turn having a respective link to a respective image, the respective image comprising at least one of a definition of the corresponding identified item and a set of database columns on which the corresponding identified item depends.

16. A system, comprising:
at least one processor; and
at least one non-transitory computer-readable medium for storing computer executable instructions that when executed by the at least one processor provide:

a database, the database being defined by a data model;
a database management system comprising a metadata model comprising descriptive information, the descriptive information defining transformations and rules to convert raw data in the database to selected output, a query engine to construct, based on user input and the descriptive information, appropriate queries to the database, and a data stream reference module configured to assist a user in interacting with a query model by displaying a plurality of images to the user, the plurality of images being linked together and providing a usage mode that comprises displaying a first display, the first display comprising, for a selected first item, an indicator of a degree to which the selected first item is at least one of used in preparation of and incorporated in a report, wherein the data model and the metadata model collectively define a hierarchical dependency structure representable as a directed acyclical graph and wherein the data stream reference module is configured to determine one or more of dependencies of items in a report and dependencies of items in a database;
forward trace from a selected first item in a first level of the directed acyclical graph to a second item in a second level of the directed acyclical graph, the second item depending upon the first item, by selecting a second link in a first image, the second link being associated with the second item and, in response, providing the user with a second image containing, in turn, one or more of: the definition and dependency information respecting the second item; and
back trace from a selected third item in a second level of the directed acyclical graph to a fourth item in a first level of the directed acyclical graph, the selected third item being dependent upon the fourth item, by selecting a third link in a second image, the third link being associated with the fourth item and, in response, providing the user with a third image containing, in turn, the definition and or dependency information respecting the fourth item, and wherein at least one of the following substeps is performed:

provide at least one of the following operating modes:
in a users mode, provide a second display to the user, the second display comprising, for the selected first item, a listing of items using the selected first item;
in a location mode, provide the user with at least one display, the at least one display comprising, for the selected first item and relative to the directed acyclical graph, a first listing of a first set of items on which the selected first item depends and a second listing of a second set of items which depend on the selected first item;
in an expression mode, display, to the user, a mathematical algorithm used to determine the selected first item, the mathematical algorithm referencing links to other items in the directed acyclical graph;
in a description mode, display, to the user, a textual definition of the selected first item, the textual definition being importable and exportable into a markup language specification of a reporting model; and
in other modes, provide the user with a plurality of: spreadsheets listing pairings of database columns with dependent items, single-page displays of chained items involved in a definition of a single report data item, and tagging of items in a reporting model;
provide the user with a series of displays, the displays permitting the user to move directly from a first item in a first dependency chain to a second item in a second, different dependency chain;

select a fifth link associated with a fifth item in a fifth image to obtain a sixth image comprising one or more of: a plurality of fact column identifiers, a plurality of dimension table column identifiers, and a database query and comprising a seventh link to a seventh image, the seventh image comprising a plurality of keys associated with one or more of: a plurality of dimension tables and a plurality of fact tables, wherein the sixth image includes a sixth item dependent upon both fact and dimension tables;

select an eighth link associated with an eighth item in an eighth image to obtain a ninth image comprising one or more of a plurality of fact column identifiers, a plurality of dimension table column identifiers, and a database query and comprising a tenth link to a tenth image, the tenth image comprising a plurality of locale filter identifiers associated with one or more of: a plurality of dimension tables and a plurality of fact tables; and provide an eleventh image listing a plurality of output reports, each output report identifier corresponding to a respective image comprising a set of items in the corresponding report, each item in turn having a respective link to a respective image, the respective image comprising at least one of a definition of the corresponding identified item and a set of database columns on which the corresponding identified item depends.

17. The system of claim 16, wherein the first level is not adjacent to the second level.

18. The system of claim 16, wherein the data stream reference module provides the plurality of operating modes operation is performed.

19. The system of claim 18 wherein the first level is not adjacent to the second level.

20. The system of claim 19, wherein the plurality of operating modes includes the usage mode.

21. The system of claim 19, wherein the plurality of operating modes includes the users mode.

22. The system of claim 19, wherein the plurality of operating modes includes the location mode.

23. The system of claim 19, wherein the plurality of operating modes includes the expression mode.

24. The system of claim 19, wherein the plurality of operating modes includes the description mode.

25. The system of claim 19, wherein the plurality of operating modes includes the other modes.

26. The system of claim 16, wherein the data stream reference module provides the user with the series of displays.

27. The system of claim 16, wherein the data stream reference module select a fifth link associated with a fifth item.

28. The system of claim 16, wherein in at least one image of a displayed item identifier is identified as being one of reported (indicating that the displayed item is referenced directly by at least one output report), exposed (indicating that no current output report references the displayed item but that the displayed item is available in the external user interface so that output reports can include the displayed item if selected by the user), required (indicating that the displayed item is a lower level item supporting a reported item reported by an output report), expected (indicating that the displayed item is a lower level item supporting an exposed item), and optional (indicating that the displayed item does not contribute in any way to the external interface and can be removed safely without any detrimental effect on the data analysis).

29. The system of claim 16, wherein a user can select in at least one image a plurality of the following options: location (which shows a hierarchical tree location of the corresponding displayed item), description (which provides a definition of the corresponding displayed item), expression (which provides mathematical expression used to determine the corresponding displayed item), usage (which displays the degree to which the corresponding displayed item is one or more of: used by reports and exposed to reports), and users (which displays a set of items using the corresponding displayed items).

30. The method of claim 1, wherein selecting the eighth link leading to the filters for an eighth item is performed.

* * * * *

UNITED STATES PATENT AND TRADEMARK OFFICE
CERTIFICATE OF CORRECTION

PATENT NO. : 8,856,182 B2  
APPLICATION NO. : 12/193542  
DATED : October 7, 2014  
INVENTOR(S) : Jeffrey J. Olson Page 1 of 1

It is certified that error appears in the above-identified patent and that said Letters Patent is hereby corrected as shown below:

In the Claims

In Claim 15, at column 20, line 50, please delete "t-he" therein.

Signed and Sealed this
Twenty-sixth Day of May, 2015

Michelle K. Lee
*Director of the United States Patent and Trademark Office*